United States Patent [19]
Ishizaka et al.

[11] Patent Number: 4,648,055
[45] Date of Patent: Mar. 3, 1987

[54] ELECTRONIC CLINICAL THERMOMETER, AND METHOD OF MEASURING BODY TEMPERATURE

[75] Inventors: Hideo Ishizaka; Yoshiki Hanzawa, both of Fujinomiya, Japan

[73] Assignee: Terumo Corporation, Tokyo, Japan

[21] Appl. No.: 817,179

[22] Filed: Jan. 9, 1986

Related U.S. Application Data

[63] Continuation of Ser. No. 561,183, Dec. 14, 1983, abandoned.

[30] Foreign Application Priority Data

Dec. 21, 1982 [JP] Japan .............................. 57-222943
Dec. 21, 1982 [JP] Japan .............................. 57-222945

[51] Int. Cl.[4] .......................... G01K 3/04; G01K 7/24; G06F 15/42
[52] U.S. Cl. .................................... 364/557; 374/107; 374/134; 374/170
[58] Field of Search ................. 364/557, 571; 73/432, 73/362; 374/103, 107, 120, 134, 169, 170, 171, 183

[56] References Cited

U.S. PATENT DOCUMENTS

| | | | |
|---|---|---|---|
| 3,702,076 | 11/1972 | Georgi .................................. | 374/169 |
| 3,872,726 | 3/1975 | Kauffeld et al. ..................... | 374/169 |
| 3,877,307 | 4/1975 | Georgi .................................. | 374/169 |
| 3,942,123 | 3/1976 | Georgi .................................. | 374/169 |
| 3,978,325 | 8/1976 | Goldstein et al. ................... | 364/557 |
| 4,022,063 | 5/1977 | West et al. ........................... | 364/557 |
| 4,068,526 | 1/1978 | Goldstein ............................ | 374/169 |
| 4,092,863 | 6/1978 | Turner ................................. | 374/169 |
| 4,232,682 | 11/1980 | Veth .................................... | 374/170 X |
| 4,418,392 | 11/1983 | Hata .................................... | 364/557 |
| 4,461,584 | 7/1984 | Murase ............................... | 374/169 X |
| 4,541,734 | 9/1985 | Ishizaka .............................. | 374/169 |
| 4,574,359 | 3/1986 | Ishizaka et al. ..................... | 364/557 |

FOREIGN PATENT DOCUMENTS

| | | | |
|---|---|---|---|
| 2912498 | 10/1980 | Fed. Rep. of Germany ...... | 364/557 |
| 3135853 | 1/1982 | Fed. Rep. of Germany . | |
| 2038000 | 7/1980 | United Kingdom ................ | 364/557 |

*Primary Examiner*—Felix D. Gruber
*Attorney, Agent, or Firm*—Frishauf, Holtz, Goodman & Woodward

[57] ABSTRACT

An electronic clinical thermometer successively stores the temperature detected at a portion of a body, and measures the time which has elapsed since start of measurement. The thermometer repeats, periodically, a process of obtaining and displaying a predicted value of a stable temperature from the detected temperature and elapsed measurement time on the basis of a stable temperature prediction function in which measurement time is a variable, the temperature prediction function defining a temperature change up to a final, stable temperature. The prediction computation is halted when, after the elapsed measurement time has exceeded a prescribed magnitude and a difference exhibited by the detected temperature corresponding to two successive points in time no longer shows an increase outside a prescribed range, the detected temperature corresponding to a present point in time exhibits a decrease outside a prescribed range when compared with the detected temperature at the preceding point in time.

18 Claims, 14 Drawing Figures

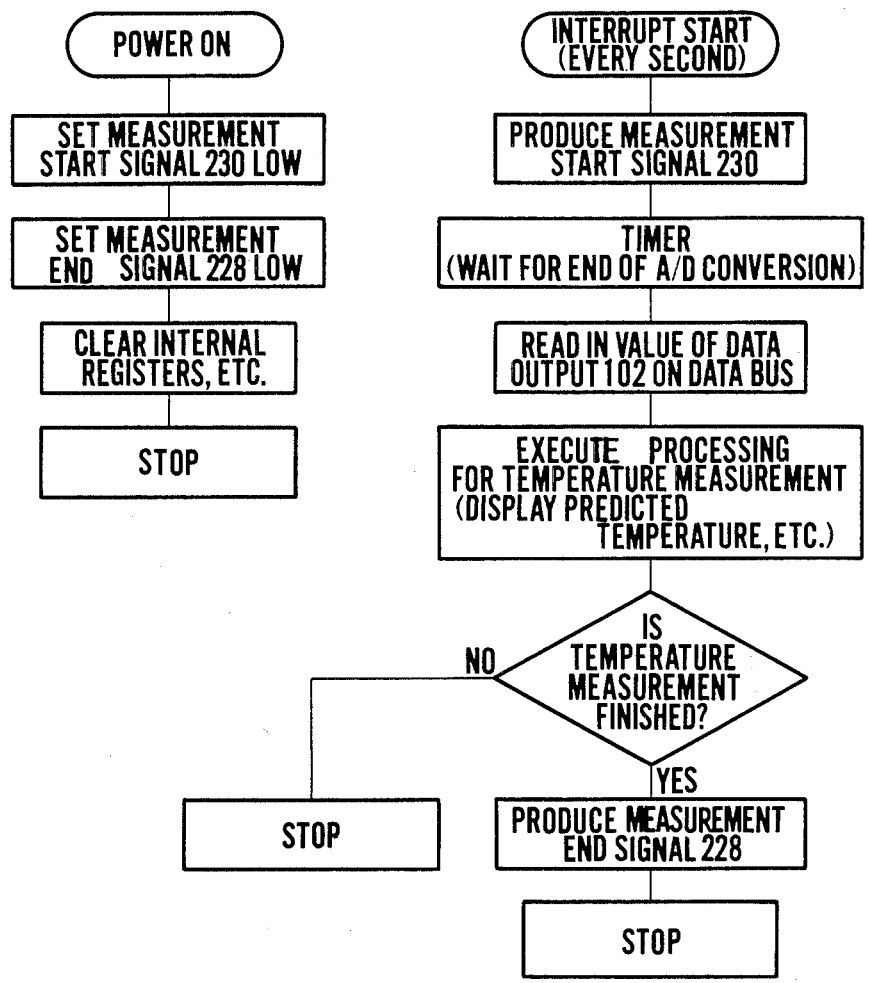

ELECTRONIC CLINICAL THERMOMETER, AND METHOD OF MEASURING BODY TEMPERATURE

This application is a continuation of application Ser. No. 561,183, filed Dec. 14, 1983, now abandoned.

CROSS REFERENCE TO RELATED APPLICATIONS

1. U.S. application Ser. No. 561,181, filed Dec. 14, 1983, and its corresponding foreign applications, namely: British Patent Application No. 83 33989 filed Dec. 21, 1983: West German Patent Application No. P 33 46 285.2 filed Dec. 21, 1983; French Patent Application No. 83 20515 filed Dec. 21, 1983; Japanese Application Nos. 57-222944 and 57-222946, both filed Dec. 21, 1982;

2. U.S. application Ser. No. 504,235, filed June 14, 1983, and its corresponding foreign applications, namely: British No. 83 17215 filed June 24, 1983; West German Patent Application No. P 33 22 834.5 filed June 24, 1983; French Patent Application No. 83 10420 filed June 23, 1984 and Japanese Patent Application Nos. 57-108895 and 57-108896, both filed June 24, 1982;

3. U.S. application Ser. No. 504,236, filed June 14, 1983 and now U.S. Pat. No. 4,541,734 (a continuation application was filed on June 24, 1985) and its corresponding foreign applications, namely: British Application No. 83 17216 filed June 24, 1983; West German Patent Application No. P 33 22 833.7 filed June 24, 1983; French Patent Application No. 83 10419 filed June 23, 1983; and Japanese Patent Application Nos. 57-108893 and 57-108894, both filed June 24, 1983; and 4. The foreign applications corresponding to the present application, namely: British Application No. 83 3390 3390 filed Dec. 21, 1983; West German Application No. P 33 46 218.6 filed Dec. 21, 1983; French Patent Application No. 83 20516 filed Dec. 21, 1983; and Japanese Patent Application Nos. 57-222944 and 57-22946, both filed Dec. 21, 1982.

BACKGROUND OF THE INVENTION

1. Field of the Invention

This invention relates to an electronic clinical thermometer and, more particularly, to a predicting-type electronic clinical thermometer for predicting the final temperature at which the thermometer will stabilize, and for displaying the predicted temperature. The invention further relates to a method of measuring body temperature.

2. Description of the Prior Art

With the conventional electronic clinical thermometer of the above-described type, the temperature which will prevail upon thermal stabilization of the electronic clinical thermometer is predicted from measured temperature and is displayed before thermal stabilization is attained. Typically, prediction of temperature is performed by monitoring, over a period of time, the measured temperature as well as the rate of change thereof with time, and employing these two variables along with a function for anticipating temperature in which the variable is the elapsed time up to the moment of observation. The predicted final, stable temperature is uniquely defined by the actual values of these three variables.

With an electronic clinical thermometer that operates by anticipating the final, stable temperature, an advantage is that measurement of temperature is completed before thermal stabilization is attained, thereby reducing the time required for measurement. However, a disadvantage with such a thermometer is that the accuracy with which temperature is predicted declines markedly unless a proper temperature anticipation function is chosen.

Ordinarily, the temperature anticipation function has a temperature rise curve the shape whereof differs depending upon the portion of the body being measured, such as the region under the armpit or the interior of the mouth.

Temperature measurement, namely the operation of predicting what the final temperature will be upon stabilization, is performed by repeating the operation at a series of discrete points in time. The measurement is judged to have ended when the value of the predicted stable temperature exhibits a rate of change within prescribed limits, that is, when the difference between the immediately preceding predicted value and the presently predicted value falls within a prescribed range. When measurement is judged to have ended in this manner, the arithmetic operations for predicting temperature cease and the predicted temperature which should be reached at stabilization is displayed. In general, the display of predicted temperature is retained or "frozen" on the display device until the thermometer power supply is turned off.

Generally, direct reading-type clinical thermometers such as the common mercury thermometer give a temperature reading closer to what the final temperature will be the longer the temperature measurement is performed. Therefore, the accuracy of the measurement rises with the length of the measurement. With the predicting-type electronic clinical thermometer, as described above, the display of the predicted value is frozen on the display device when the measurement is judged to have ended so that, unlike the direct reading thermometer, a more accurate predicted value will not appear on the display even if the length of the measurement is extended. In other words, the conventional predicting-type electronic clinical thermometer can only present a display of predicted stable temperature the accuracy of which is a characteristic of the particular thermometer.

When an electronic clinical thermometer is manufactured or shipped, or during use of the thermometer at a medical facility such as a hospital, it is common practice to perform an inspection for the purpose of calibrating or verifying the absolute precision of the thermometer. However, a predicting-type electronic clinical thermometer presents a problem. Specifically, when an ordinary constant temperature bath is used to test the thermometer, the predicted value displayed is different from the actual temperature of the bath. To avoid this problem, even the electronic clinical thermometer must be so designed as to make a transition to the direct-reading operating mode under special temperature conditions, with the inspection being carried out under these temperature conditions. Alternatively, the electronic clinical thermometer must be provided with a mode changeover switch so as to enable selection of either the predicting or direct-reading operating mode.

As mentioned above, the temperature rise curve, which is for carrying out the arithmetic temperature computations, has a shape which differs depending upon the portion of the body being measured, such as the armpit region or the interior of the mouth. Also, the predicting-type electronic clinical thermometer is adapted to retain the value of the predicted temperature on the display at the conclusion of the measurement computations. Therefore, if the thermometer for measuring temperature orally is used to conduct a measurement in the armpit, the predicted value displayed will not be correct. The same is true if the thermometer for armpit measurement is used for oral measurement.

SUMMARY OF THE INVENTION

The object of the present invention is to provide an electronic clinical thermometer, as well as a method of measuring body temperature, in which computations for predicting a final, stabilized temperature having a high degree of reliability can be performed at a precision in line with the purpose of the measurement, namely at a precision decided by the volition of the user.

According to the present invention, the foregoing objects are attained by providing an electronic clinical thermometer comprising temperature detecting means for detecting temperature at a part of a body and for generating a first signal indicative of the detected temperature, storage means for sequentially storing the first signal, elapsed time measuring means for measuring time which has elapsed since start of measurement and for generating a second signal indicative of the measured elapsed time, arithmetic means for obtaining a predicted value of a stable temperature from the first and second signals on the basis of a stable temperature prediction function in which measurement time is a variable, the function defining a temperature change up to final, stable temperature, first control means in response to which a computation for predicting stable temperature is performed periodically by the arithmetic means display means for displaying the predicted value of stable temperature, and second control means responsive to the elapsed time measuring means for reading the first signal, corresponding to two successive points in time, out of the storage means and comparing the two signals. After the second control means finds that the second signal has exceeded a first prescribed elapsed time and that a difference exhibited by the first signal corresponding to two successive points in time no longer shows an increase outside a first prescribed range, the first signal corresponding to a present point in time is compared with the first signal at the preceding point in time and, when the first-mentioned first signal exhibits a decrease outside a second prescribed range, the second control means halts the operation of the arithmetic means. When the second control means compares the first signal corresponding to a present point in time with the first signal at the preceding point in time and finds that the first-mentioned first signal exhibits a decrease outside the second prescribed range before the difference exhibited by the first signal corresponding to two successive points in time ceases to show an increase outside the first prescribed range, the second control means causes the display means to present a first display indicative of this state. The display means includes an audible signal generator. When the second control means finds that the second signal has exceeded a prescribed elapsed time and that the difference exhibited by the first signal corresponding to two successive points in time no longer shows an increase outside the first prescribed range, the second control means actuates the audible signal generator. When a predicted value produced as an output by the first arithmetic means is outside a third prescribed range, the second control means causes the display means to present a second display indicative of this state. The second control means causes the display means to present the first or second display and then halts the operation of the arithmetic means. The display means includes a liquid crystal display element for presenting a visual display of the predicted value, and illuminating means for illuminating the liquid crystal display element. The second control means actuates the illuminating means for a predetermined period of time before halting operation of the arithmetic means. When the second signal exceeds a second prescribed elapsed time greater than the prescribed length and greater than the first prescribed elapsed time, the second control means halts operation of the arithmetic means.

In another aspect of the present invention, the electronic clinical thermometer comprises temperature detecting means for detecting temperature at a part of a body and for generating a first signal indicative of the detected temperature, storage means for sequentially storing the first signal, elapsed time measuring means for measuring time which has elapsed since start of measurement and for generating a second signal indicative of the measured elapsed time, arithmetic means for obtaining a predicted value of a stable temperature from the first and second signals on the basis of a stable temperature prediction function in which measurement time is a variable, the function defining a temperature change up to final, stable temperature, first control means in response to which a computation for predicting stable temperature is performed by the arithmetic means at a predetermined period, display means for displaying the predicted value of stable temperature, and second control means responsive to the elapsed time measuring means for reading the first signal, corresponding to two successive points in time, out of the storage means and comparing the two signals, wherein after the second control means finds that the second signal has exceeded a first prescribed elapsed time and that a difference exhibited by the first signal corresponding to two successive points in time no longer shows an increase outside a first prescribed range, the first signal corresponding to a present point in time is compared with the first signal at the preceding point in time and, when the first-mentioned first signal exhibits a decrease outside a second prescribed range, the second control means halts the operation of the arithmetic means, and holding means for holding the predicted value of stable temperature prevailing when operation of the arithmetic means is halted. The display holding means causes the display means to display the predicted value of stable temperature prevailing when operation of the arithmetic means is halted. When the second control means compares the first signal corresponding to a present point in time with the first signal at the preceding point in time and finds that the first-mentioned first signal exhibits a decrease outside the second prescribed range before the difference exhibited by the first signal corresponding to two successive points in time ceases to show an increase outside the first prescribed range, the second control means causes the display means to present a first display indicative of this state. When a predicted value produced as an output by the arithmetic means is outside a third prescribed range, the second control means causes the display means to present a second display indicative of this state. The second control means causes the display means to present the first or second display and halts the operation of the arithmetic means. The display means includes a liquid crystal display element for presenting a visual display of the predicted value, and illuminating means for illuminating the liquid crystal display element. The second control means actuates the illuminating means for a predetermined period of time before halting operation of the arithmetic means. When the second signal exceeds a second prescribed elapsed time greater than the prescribed length and greater than the first prescribed elapsed time, the second control means halts operation of the arithmetic means. The holding means holds the predicted value of thermal temperature until a measurement is started again.

The objects of the invention are further attained by providing a method of measuring body temperature including steps of detecting temperature at a part of a body and generating a detected temperature indicative of the temperature, storing the detected temperature, measuring time which has elapsed since start of measurement and generating an elapsed measurement time indicative of the elapsed time, obtaining a predicted value of a stable temperature from the detected temperature and elapsed measurement time on the basis of a stable temperature prediction function in which measurement time is a variable, the function defining a temperature change up to final, stable temperature, performing a stable temperature prediction computation at a predetermined period and displaying the predicted value of stable temperature obtained, and halting the prediction computation when, after the elapsed measurement time has exceeded a prescribed magnitude and a difference exhibited by the detected temperature corresponding to two successive points in time no longer shows an increase outside a prescribed range, the detected temperature corresponding to a present point in time exhibits a decrease outside a prescribed range in being compared with the detected temperature at the preceding point in time.

Other features and advantages of the present invention will be apparent from the following description taken in conjunction with the accompanying drawings, in which like reference characters designate the same or similar parts throughout.

BRIEF DESCRIPTION OF THE DRAWINGS

FIGS. 13A, 13B are flowcharts indicating CPU operation and control when power is introduced to a microcomputer shown in FIG. 9.

DESCRIPTION OF THE PREFERRED EMBODIMENT

Figure 1:
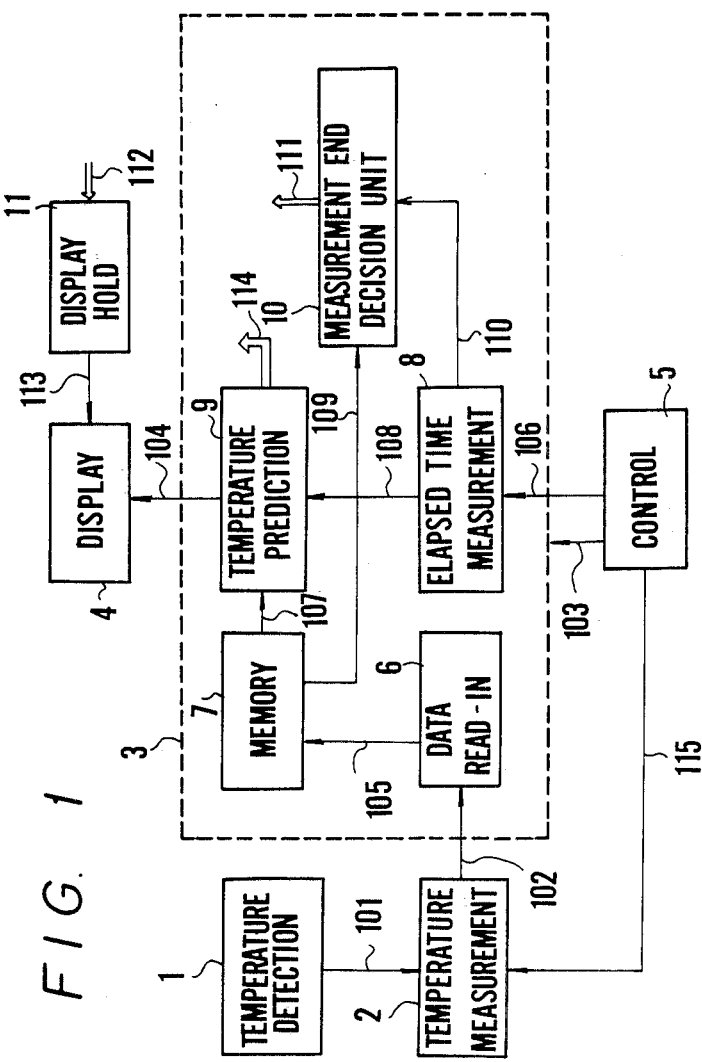
FIG. 1 is a block diagram illustrating an embodiment of an electronic clinical thermometer according to the present invention.

Reference will now be had to the block diagram of FIG. 1 showing the basic construction of an embodiment of an electronic clinical thermometer according to the present invention. The electronic clinical thermometer includes a temperature detecting unit 1 having a temperature responsive element, a measurement circuit 2 for converting an electrical output from the temperature detecting unit 1 into temperature data, a processor 3 for obtaining stabilized temperature by processing the temperature data from the circuit 2, a display unit 4 for displaying the results of the data processing, and a control unit 5 for controlling the display unit 4, processor 3 and measurement circuit 2. Connected to the display unit 4 is a display holding device 11 which causes the display unit 4 to retain or "freeze" what is displayed. It will be apparent from the following discussion that the processor 3 is realized by a microcomputer capable of being constructed on a single chip, with the temperature detecting unit 1 and measurement circuit 2 serving as the input unit of the microcomputer, and the display unit 4 serving as the output unit. More specifically, in terms of construction, the processor 3 is realized by using the ordinary hardware of a general-purpose microcomputer, namely a central processing unit (CPU), read-only memory (ROM) and random-access memory (RAM). It should be noted that the individual elements constituting the processor 3 specify, in the form of the labeled blocks, respective functions implemented by a program stored in the read-only memory (ROM). Accordingly, those skilled in the art should be capable of readily understanding the construction and operation of the invention to a degree necessary for working the same.

The processor 3 executes processing in accordance with a control signal 103 received from the control unit 5, and includes such subroutine units as a data read-in unit 6, memory 7, elapsed time measurement unit 8, predicting arithmetic unit 9 and measurement end decision unit 10.

The data read-in unit 6 reads in the temperature data produced by the measurement circuit 2, and stores the data in the memory 7. The elapsed time measurement unit 8, in response to a clock signal 106 received from the control unit 5, measures elapsed time once the processor 3 has been set into operation. Since the control unit 5 produces the control signal 103 in response to which the processes executed by the components of the processor 3 are performed periodically as prescribed, it is obvious that this signal can be utilized in place of the clock signal 106 if desired.

The predicting arithmetic unit 9 is the key unit in the processor 3. In response to the temperature detected by the temperature detecting unit 1, the arithmetic unit 9 computes, in accordance with a temperature predicting function, the value at which temperature is predicted to finally stabilize. The measurement end decision unit 10, which is one of the important characterizing features of the present invention, judges whether the conditions for ending the predicting computations in the arithmetic unit 9 have been attained. The arithmetic unit 9 and decision unit 10 will be described in further detail hereinbelow.

Figure 2:
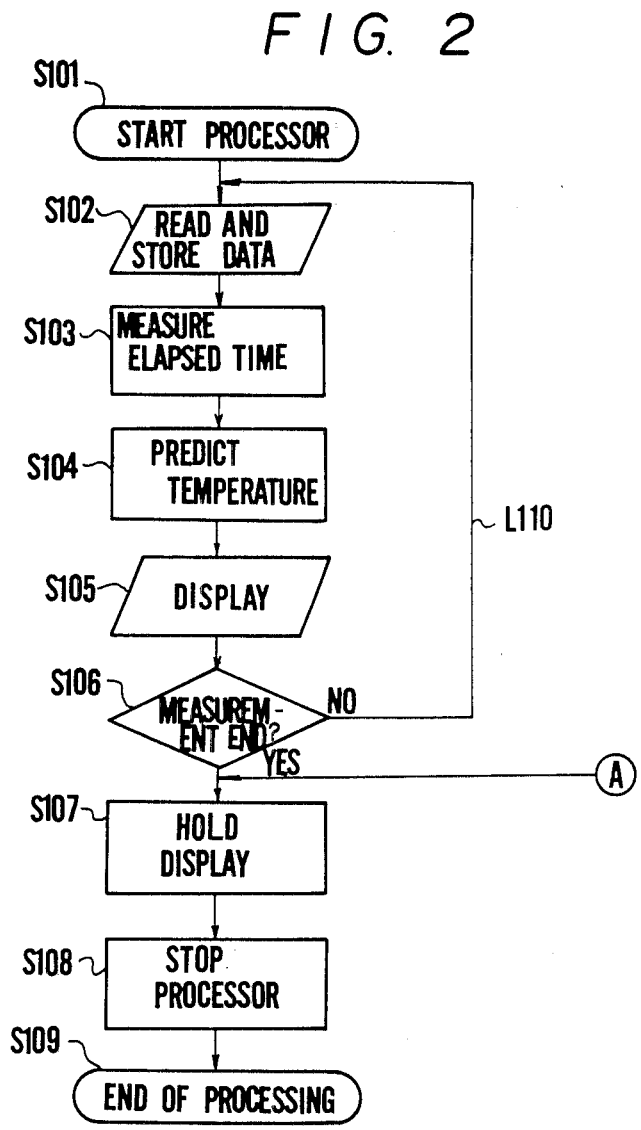
FIG. 2 is a flowchart indicating the operation of the electronic clinical thermometer shown in FIG. 1.

The operation of the embodiment shown in FIG. 1 may be understood from the flowchart of FIG. 2. When the temperature detecting unit 1 is placed in the patient's mouth or armpit, the electrical output 101 undergoes a change. The reason for this change is the temperature responsive element, such as a thermistor incorporated within the detecting unit 1, the electrical characteristic whereof varies with temperature. The measurement circuit 2 receives the output 101 and converts it into temperature data in the form a temperature output 102 applied to the data read-in unit 6 of the processor 3. If the processor 3 is in the operating state at this stage, the process steps indicated in FIG. 2 are implemented one after another in accordance with the control signal 103 produced by the control unit 5. Any conditions for starting the operation of the processor 3 may be adopted. For example, the processor can be started merely by closing a power supply switch (not shown). Alternatively, an arrangement is possible wherein the measurement circuit 2 performs a preliminary measurement of rough accuracy in advance, with the processor 3 being set into operation automatically when the temperature detected by the detecting unit 1 exceeds a predetermined value and exhibits a change in excess of a predetermined value. Electrical power can be conserved with the latter arrangement, which is that adopted in the illustrated embodiment, because the processor 3 is in a non-operative stand-by state during the course of the preliminary measurement. Specifically, in the illustrated embodiment, the measurement circuit 2, in accordance with a control signal 115 from the control unit 5, performs a rough preliminary measurement at a fixed period of, say, once every four seconds. To this end, the measurement circuit 2 includes a temperature threshold detecting circuit and a temperature change detecting circuit, both of which will be described later, for determining when the temperature detected by the detecting unit 1 has exceeded a predeterined value, such as 30° C., and for detecting when the change in said temperature has surpassed a predetermined rate, such as 0.1° C. per second. When these conditions have been detected, the measurement circuit 2 turns on the processor 3 through the control unit 5. Thereafter, a highly precise temperature measurement is performed over an extended period of time at a short period of, for example, once per second, and body temperature is measured based on the temperature predicting computations. The details of the measurement circuit 2 and control unit 5 will be described in greater detail below.

Thus, in the flowchart of FIG. 2, the processor 3 is turned on in step S101. Next, in step S102, during the operation of the processor 3, the data read-in unit 6 receives the temperature data output 102, reads in the data and, by a write signal 105, plants the new temperature data in the memory 7. The elapsed time measuring unit 8 within the processor 3 measures elapsed time in response to the clock signal from the control unit 5. This is step S103, which is executed periodically, namely at the predetermined period of the clock signal 106.

In the present embodiment, the predicting arithmetic unit 9 receives the most recent temperature data stored in the memory 7, and the elapsed time measured by the elapsed time measuring unit 8, these arriving in the form of a data signal 107 and elapsed time signal 108. Using these input signals, the arithmetic unit 9 executes the predicting computations in step S104, thereby predicting what the final temperature will be upon stabilization, which will occur three to ten minutes hence, by way of example. The details of the arithmetic unit 9 will be described later. For the time being, however, the significance of the arithmetic unit 9 in connection with the measurement end decision unit 10, which constitutes an important feature of the present invention, will be discussed.

In brief, according to a characterizing feature of the invention, a temperature predicting computation is performed, and the results displayed, with each and every measurement cycle until it is judged by the decision unit 10 that the measurement has ended.

Generally speaking, in measuring body temperature, the time required for the final, stable temperature to be reached is about 3 min for oral measurement and 5 to 10 min for measurement in an armpit, with the temperature detected by the detecting unit 1 approaching the final, stable temperature as measurement time passes. The algorithm for the temperature predicting computation is set in such a manner that the temperature predicted during the course of measurement will also approach the final, stable temperature with time, the reason being that the temperature reached on stabilization is predicted by using the temperature detected by the detecting unit 1 as a reference. For example, during the course of measurement, the point in time at which a stable temperature will be reached is judged from the relation between elapsed time and measured temperature. In performing the temperature predicting computations, these computations should be carried out in such a manner that the temperature added to the measured temperature to predict the final temperature is diminished smoothly with elapsed time until this temperature increment becomes exactly zero at said point in time. An even better approach is to fix the computation method in such a manner that the temperature to be added is smoothly diminished from the start and becomes zero after, say, 10 min. Fairly good results can be obtained even with this approach. If an arrangement of the type described above is adopted, the results of the prediction computations will grow more accurate with elapsed time and, when a certain length of time has passed, the measured temperature itself will be the result of a computation, so that coincidence is achieved between the measured temperature and the final, stable temperature.

Other methods of performing the prediction computations can be devised. Ordinarily, the error between the predicted value of the final, stable temperature and the final temperature actually reached upon stabilization is ±0.2° C. when the prediction is made 30 to 40 sec from the start of an oral measurement, and 45 to 60 sec from the start of an armpit measurement. However, even in the case of temperature taken orally, the deviation from what the final temperature will be is ±0.5° C. at, say, 15 sec into the measurement, demonstrating that the results are not usable for practical purposes after a short interval. Therefore, in detecting temperature orally, the result of a temperature predicting computation is not displayed until 30 sec have passed, or care is taken to give the user of the thermometer an impression of a natural temperature transition, such as by initially displaying a somewhat low temperature and allowing the displayed value to approach the predicted value as time passes.

It is also important that the computations be carried out upon taking into consideration the fact that the manner in which detected temperature changes with various measurement conditions differs even when the same method of detection is used. When the temperature detected by the detecting unit 1 changes at a high rate of change, this generally indicates that still more time is needed before temperature stabilization will be reached. When the rate of change is not so great, this indicates that the measured temperature is close to what the final, stabilized temperature will be. As to how various measurement conditions influence detected temperature, let us consider an armpit temperature measurement as an example. If the reading is taken after the armpit has been held closed for some time, the final temperature will be reached sooner than otherwise. The difference in time needed to achieve temperature stabilization is from 5 to 10 sec between the two cases. Therefore, taking as one criterion the instant at which a prescribed rate of temperature change appears, measures can be taken to end the computations, or inform of their completion, at said instant. In the embodiment of the present invention, the temperature predicting computations continue even upon passage of the instant in time at which a prescribed rate of temperature change is reached, and the results of the computations are updated each measurement cycle until measurement is terminated. However, the instant in time at which the prescribed rate of temperature change is attained is used in determining the end of the measurement, as will be described later.

In any case, the arithmetic unit 9 executes the temperature predicting computation of step 104 in the flowchart of FIG. 2 and produces an output 104 which is applied to the display unit 4. The latter displays the output in step S105. Meanwhile, the measurement end decision unit 10, representing one characterizing feature of the present invention, periodically reads in the most recent temperature data output 109 from the memory 7, as well as the elapsed time signal 110 from the elapsed time measuring unit 8, and constantly performs a monitoring operation to determine the end of a measurement.

Three conditions are used to determine the end of a temperature measurement. Specifically, (1) elapsed time must exceed a predetermined value, (2) the change in temperature must be less than a certain, fixed value, after which (3) the most recently detected temperature data must exhibit a temperature drop in excess of a predetermined value.

Among these three conditions, the first is essential in terms of obtaining computed results that are reliable. If a determination were based solely on the second condition, the result of a temperature predicting computation would faithfully appear on the display even in the event of a measurement performed incorrectly, such as removing the thermometer from the body in mid course. The first condition is provided to avoid this problem.

The purpose of the second condition is to make the best use of the thermometer, namely to provide the results of measurement quickly, as in temperature detection with good response, with reliability being assured by the first condition. Therefore, fairly good results can be obtained even if the second condition is omitted, provided that the elapsed time limitation of the first condition is lengthened. Further, as mentioned above, the original purpose of the second condition is to perform a prediction of approximately the same precision at one speed commensurate with a situation where the detected temperature achieves stabilization quickly, and at a different speed commensurate with a situation where rapid stabilization is not the case. Accordingly, in performing the temperature predicting computations, a condition (4) can be substituted for condition (2), namely a condition based on the time at which the magnitude of the temperature to be added to the measured temperature falls below a certain, fixed value.

In the execution of the measurement end decision step S106 performed by the decision unit 10, the third condition is the most important of the foregoing three conditions. When the first and second conditions have been satisfied, the predicted temperature value which appears on the display unit 4 is highly reliable. For ordinary purposes, therefore, the temperature detection operation can be terminated at such point in time without any practical problem. There are of course a variety of methods that can be adopted to terminate temperature detection, but since termination is accompanied by the operation of removing the temperature detecting unit 1 from the body, perhaps the most logical approach to deciding whether temperature detection has been terminated is make this decision in response to said operation. Specifically, to this end, a touch sensor for sensing that the temperature detecting unit 1 has been removed from the body may be provided near the detecting unit 1. The decision that measurement has ended can be made in response to a signal from this sensor, this arrangement being more advantageous for users than a configuration using a mechanical switch.

When the temperature detecting unit 1 is removed from the body, the detected temperature declines under ordinary environmental conditions. According to the present invention, the decision unit 10 determines that temperature detection has ended by utilizing this phenomenon. More specifically, after the first and second conditions have been satisfied, the decision unit 10 produces an output signal 111, which is indicative of the end of a measurement, when the most recent temperature detected by the detecting unit 1 exhibits a drop of more than 0.1° C. When the signal 111 is produced, a portion of the signal is appled to the display holding device 11 as a signal 112 instructing the operation of the holding unit. The latter delivers a display hold signal 113 to the display unit 4, which responds by executing the display holding step S107 in the flowchart of FIG. 2, thereby to freeze the display which is being presented by the display unit at that time. Simultaneously, the measurement end signal 111 causes step S108 of the flowchart to be executed, so that at least the processor 3 ceases operating. The processor 3 thus is shut down in the final step S109.

If the decision rendered in step S106 is that measurement has not ended, then processing moves to a loop L110 to continue the measuring operation. In other words, even if the first and second conditions of the three conditions relating to the decision step S106 are satisfied, operation will move to the loop L110 unless the third condition also is satisfied. This third condition is satisfied in almost all cases as a result of human intervention in measurement of body temperature. Therefore, as described above in the section dealing with the temperature predicting computations, the accuracy of these computations will rise with elapsed time, and the results will be displayed on the display unit 4, so long as the user of the thermometer does not terminate the measurement of his own volition. Accordingly, a satisfactory arrangement is one in which a buzzer or the like is activated when the first and second conditions have been satisfied, thereby to inform the user of the fact so that he may terminate the measurement at such time, providing that the temperature is being measured for ordinary purposes. If a higher accuracy is required, the user may allow the measurement to continue at his own volition. When the latter is the case, a highly reliable predicted value of final, stabilized temperature will be obtained with the passage of time. When a certain, fixed period of time has passed, the displayed result will coincide exactly with the final, stabilized temperature.

Thus, the present invention is characterized in that, in a predicting-type electronic clinical thermometer, (a) the prediction accuracy rises with elapsed time, and (b) it is possible to obtain a measured value sufficiently near the final, stabilized temperature if the individual performing the measurement so desires.

The effects of the present invention are of major significance, two of which will now be described. The first is that the electronic clinical thermometer of the invention makes it possible to measure final, stabilized temperature correctly even with different methods of detecting temperature. The methods of temperature detection generally employed are oral, armpit and rectal. Historically, oral detection generally is the custom in the United Kingdom, while rectal detection is the method usually employed in Germany. Rectal temperature detection is widely employed in newly born infants and in patients under anesthesia. In most countries, the method likely to be employed is the oral or armpit method. With the conventional predicting-type thermometer, however, it is debatable whether the same thermometer can be used in both methods for the purpose of predicting temperature. Specifically, between these two methods of temperature detection, there is a great difference in the temperature transition curve from the start of measurement to the attainment of temperature stabilization. As a result, performing a temperature prediction in both methods with one and the same predicting-type electronic clinical thermometer involves some difficulty in the prior art. In many cases, therefore, actual practice is to adopt a design in which the prediction of final temperature is made in a way to best suit the method of detection. Ordinarily, then, the practice which has been settled upon is to use a predicting-type electronic clinical thermometer specially designed for one or the other of the detection methods. Nevertheless, there are occasions where it is necessary to adopt a detection method other than that for which the thermometer has been intended. While rectal and oral detection are similar to each other in terms of temperature predicting techniques, situations quite often arise wherein a thermometer intended for armpit measurement is used to detect temperature rectally or orally. In accordance with the embodiment of the present invention, final, stabilized temperature can be measured correctly so long as elapsed time is in excess of a predetermined length of time, irrespective of the temperature detection method.

The second major effect of the present invention concerns the matter of thermometer calibration and inspection. Since the value displayed by a predicting-type electronic clinical thermometer is the predicted value of what the temperature will be upon thermal stabilization, this value being the result of the temperature predicting computations, one cannot know what the value of the true temperature is, namely the actual temperature of the body region being measured. Accordingly, when performing a temperature calibration or inspection with the predicting-type electronic clinical thermometer of the prior art, troublesome provisions must be made for switching to a mode in which the detected temperature is displayed directly, or converting to a direct reading system when specific temperature conditions have been applied. With the present invention, these problems are completely eliminated.

The predicting arithmetic unit 9 predicts or anticipates the temperature at the present time, using a prediction function defining a temperature change, from a temperature actually measured at a certain past time, compares the anticipated temperature with temperature actually measured at the present time and, when the difference between these two temperatures is within predetermined allowable limits, predicts and displays what the final temperature should be upon stabilization. When the difference falls outside the allowable limits, the temperature predicting computation is repeated after altering the temperature prediction function. An arrangement is possible wherein temperature measurement and the predicting computation are repeated even when the abovementioned difference lies within the allowable limits, with the repetition of these operations being carried out until a decision has been rendered to the effect that the measurement has been terminated. This will permit the displayed anticipated value to be updated to a more accurate value.

In measuring body temperature, the form of temperature change from the start of measurement until the attainment of temperature stabilization differs widely depending upon the thermal characteristics of the clinical thermometer, the state of the region where the temperture is sensed, and the region itself. If the thermal characteristics of the clinical thermometer are limited, however, then the various temperature change patterns can be classified into a number of categories. In other words, placing a limitation upon the thermal characteristics will make it possible to define a number of temperature change patterns. Two major categories of temperature change are those resulting from, say, measurement orally and measurement by placement of the thermometer in an armpit. Although other categories may also be conceived, the following discussion will deal with body temperature measured orally.

It is known from oral measurement of temperature for a wide variety of cases that approximately three to five minutes is required for stabilization of temperature with a thermometer having a given thermal characteristic. Let U* represent the difference between final, stabilized temperature Te and a temperature T during measurement. Upon investigation, it is found that U* is expressed with good accuracy by the following formula at the comparatively early stage of measurement:

$$U^* = Te - T = \alpha t + \beta + C(t+\gamma)^\delta \quad (1)$$

where:
U*: difference between what the final, stabilized temperature will be, and the temperature measurement
t: time from beginning of measurement
C: variable parameter $\alpha, \beta, \gamma, \delta$: constants in conformance with measurements made under constant conditions.

In particular, for oral measurement of body temperature, the following is found to hold with good regularity, based upon experiments:

$$U^* = -0.001t + 0.05 + C(t+1)^{-1.0} \quad (6 < C < 26) \tag{2}$$

where t is measured in seconds and $U^*$ in degrees Centigrade. Therefore, an arithmetic expression is set up such that a predicted temperature Tp, namely a temperature obtained by predicting the final, stable temperature Te, will correspond to the sum of the temperature T at the time temperature is anticipated and a correclive temperature differential U, which is equivalent to Eq. (2). Accordingly, we will have a first prediction function, given by the following, defining a corrective temperature differential used for prediciting temperature:

$$U = Tp - T = -0.001t + 0.05 + C(t+1)^{-0.1}$$
$$(6 < C < 26) \tag{3}$$

Figure 3:
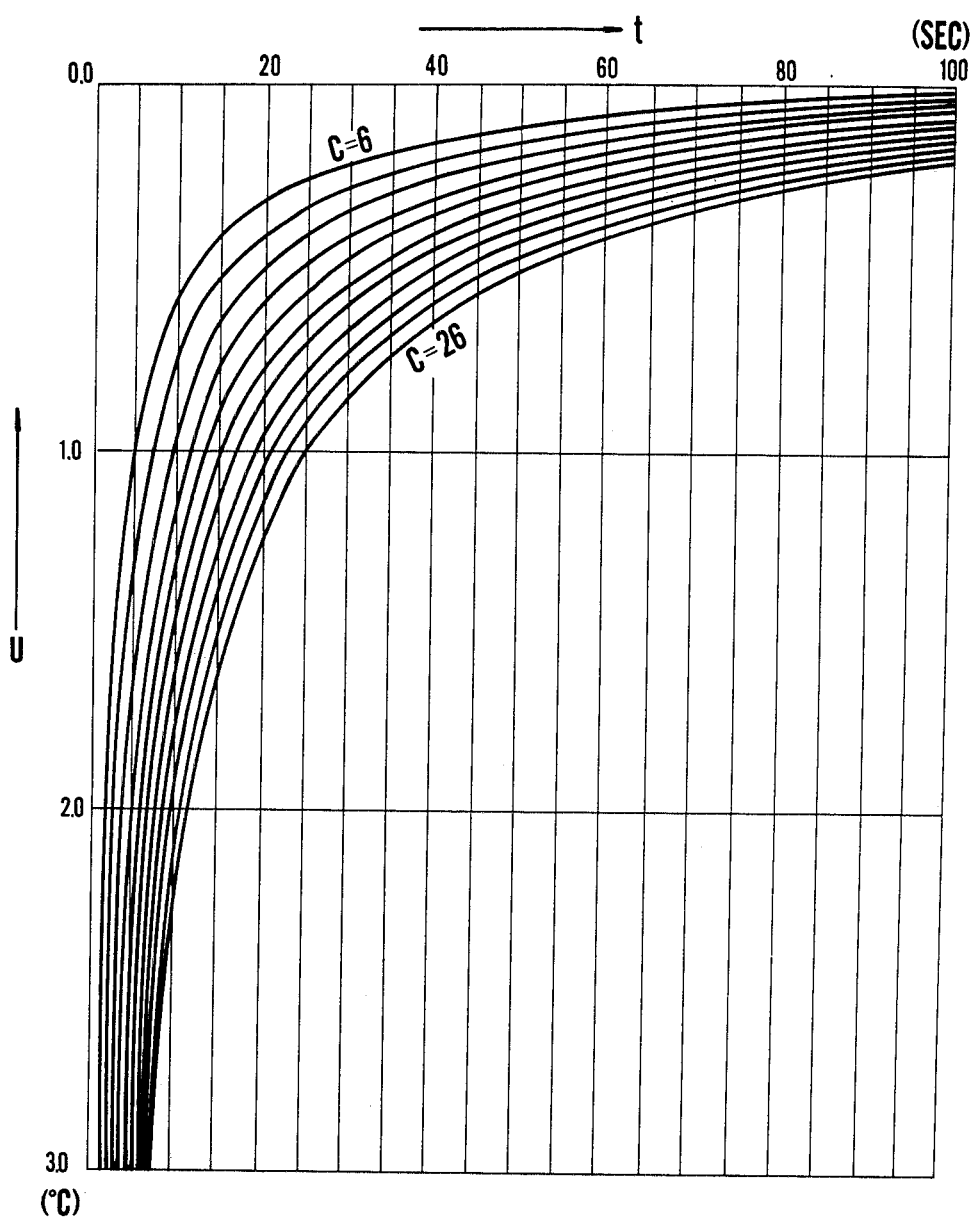
FIG. 3 is a graph indicating change, with time, of a corrective temperature differential U for anticipation of final temperature in connection with a variable parameter $C = 6\ 26$, where body temperature is sensed orally.

In Eq. 3, the reason for replacing $U^*$ with U is that the final temperature Te upon stabilization corresponds to the predicted temperature Tp as far as execution of the prediction process is concerned. When the value of the parameter C is varied from C=6 to C=26, the curves shown in FIG. 2 are the result. It should be noted that the curves shown in FIG. 3 also hold with good accuracy for temperature sensed rectally.

Figure 5:
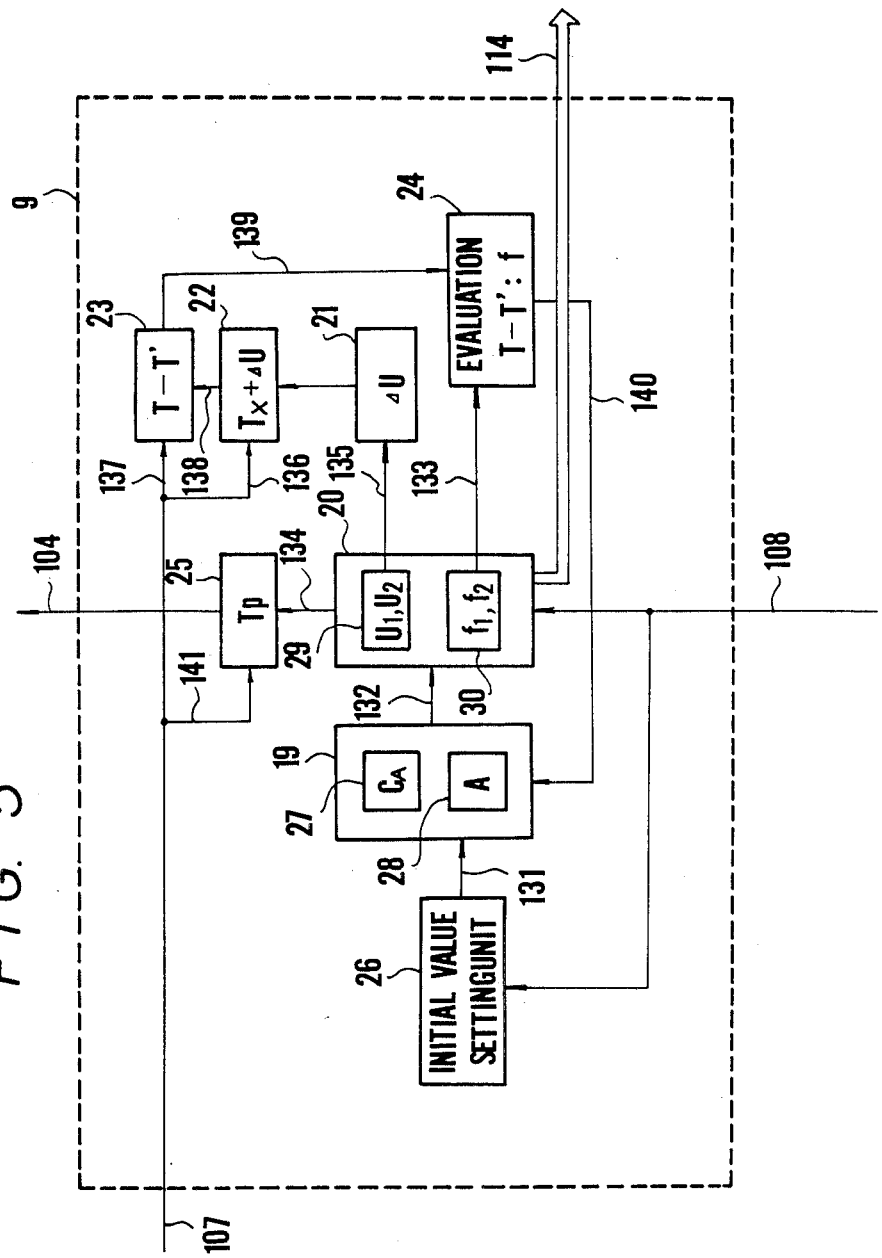
FIG. 5 is a block diagram illustrating an embodiment of a predicting arithmetic unit according to the present invention.
Figure 6:
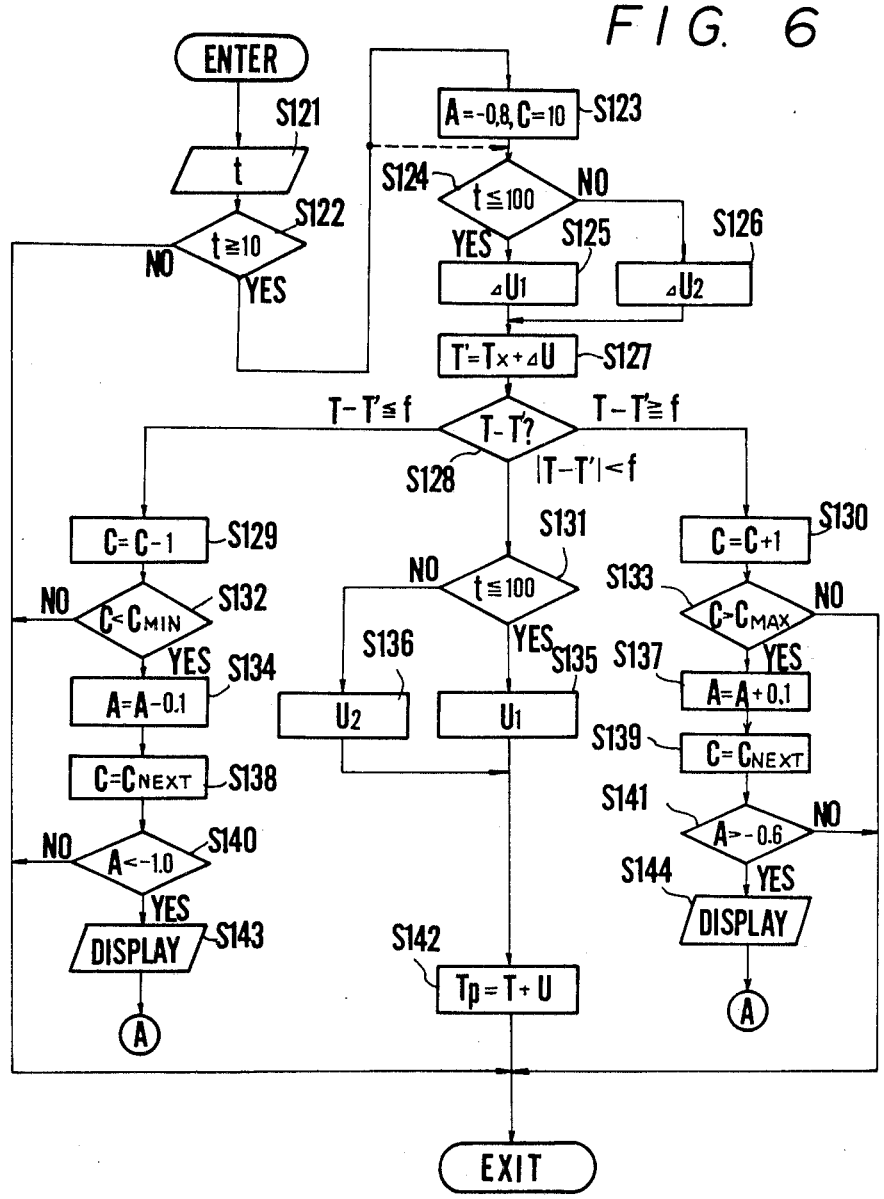
FIG. 6 is a flowchart indicating the operation of the arrangement shown in FIG. 5.

FIGS. 5 and 6 illustrate a block diagram and flowchart, respectively, of the predicting arithmetic unit 9, which is capable of predicting final temperature regardless of whether temperature is sensed orally or by placing the thermometer in an armpit.

The expression of the corrective temperature differential for temperature sensed orally is as indicated earlier. For detecting body temperature both orally and in an armpit, the first prediction function is given by either of the following, depending upon the decision rendered in step 131 of the flowchart (FIG. 6), in which 100 seconds serves as a boundary value:

$$U_1 = (-0.0025A - 0.0035)t + 0.5A + 0.55 + C(t+1)^A \tag{4}$$

where $10 < t \leq 100$), $$U_2 = (-0.0025A - 0.0035)t + 0.5A + 0.55 + C(t+1)^A + 0.02(t-100)/(C+10) \tag{5}$$

where $t > 100$). Thus, when $10 < t < 100$ holds, the arithmetic operation of Eq. (4) corresponds to step S135. When $t > 100$ holds, the arithmetic operation of Eq. (5) corresponds to step S136. In the above, A is a variable parameter. The range over which the parameter C can be varied with respect to A is as shown in the following TABLE I. When A = -1.0, Eq. (4) reduces to Eq. (3). When A = -0.6, Eqs. (4) and (5) give the corrective temperature differential for sensing temperature in an armpit.

TABLE I

| A | $C_{MIN}$ | $C_{MAX}$ |
|---|---|---|
| −0.6 | 2 | 12 |
| −0.7 | 6 | 12 |
| −0.8 | 9 | 11 |
| −0.9 | 8 | 18 |
| −1.0 | 6 | 26 |

The elapsed time measuring unit 8 responds to the clock signal 106 (FIG. 1) from the control unit 5 by measuring elapsed time from the start of measurement, and producing the elapsed time signal 108 that is applied to main arithmetic means 20 within the predicting arithmetic unit 9, as shown in FIG. 5. When ten seconds have passed, an initial value setting unit 26 responds by delivering an initial setting signal 131 to a main counter register 19.

The main counter register 19 is connected to the main arithmetic means 20 and constitutes a counter for setting and counting the parameters C and A, as will be described below. The main arithmetic means 20 monitors the elapsed time signal 108 and selects computation and processing operations conforming to the magnitude of the signal in order to compute the corrective temperature differential U and evaluation function f. It also monitors the corrective temperature differential, and instructs subsequent steps in accordance with the magnitudes thereof to deliver the corrective temperature differential.

The output 135 of the main arithmetic means 20 is connected to temperature increment computing means 21 for conputing the temperature increment $\Delta U$, and to evaluation computing means 24 which, using the evaluation function f from the main arithmetic means 20, evaluates the difference between real-time temperature and the results of predicting the present temperature based on data which prevailed ten seconds earlier. The evaluating means 24 produces an instruction signal 140 indicative of the evaluation, which signal is applied to the main counter register 19. The main arithmetic means 20 also produces an output signal 134 indicative of the corrective temperature differential. This signal is connected to adding means 25 for computing a predicted, final temperature Tp, a signal 104 indicative of said temperature being applied to the display unit 4.

When the processor 3 in FIG. 1 starts to execute processing, the control unit 5 causes the elapsed time measuring unit 8 to start accepting the clock signal 106 so that an elapsed time measuring step S121 will be executed in the flowchart of FIG. 6.

The elapsed time measuring unit 8 applies the elapsed time signal 108 to the main arithmetic means 20 and initial value setting means 26. When t > 10 holds in step S122, the initial value setting unit 26 performs the initial value setting step S123. Step S122 is a decision step which calls for waiting a certain period of time until a subsequent temperature prediction step takes on meaning. For example, the system waits in standby for the initial ten seconds until start of a computation for a corrective temperature. The reason is that the accuracy of temperature prediction is extremely poor, and would give unsatisfactory results, for a period of less than ten seconds. Accordingly, the subsequent temperature prediction steps are not executed until ten seconds have passed. When the decision rendered in block 122 is that ten seconds have passed, the initial value setting unit 26 executes step S123 and applies the initial value setting signal 131 to the main counter register 19, whereby parameter A is initially set to −0.8, and parameter C is initially set to 10. Once the initial setting step S123 has been executed, it is skipped in subsequent processing.

Meanwhile, the elapsed time measuring unit 8 is applying the elapsed time signal 108 to the main arithmetic means 20, which uses the signal 108 along with a parameter signal 132 from the main counter register 19 for performing the operations of Eqs. (4) and (5). The main arithmetic means 20 functions to (a) monitor the elapsed time signal 108 and select computation and processing steps in accordance with the magnitude thereof, (b) compute the corrective temperature differential U and the evaluation function f (these being expressed by blocks 29, 30, respectively), (c) monitor the corrective temperature differential, (d) indicate the next step in accordance with the magnitude thereof, and (e) deliver the corrective temperature differential as an output signal. Computation of the corrective temperature differential entails obtaining two corrective temperature differentials for identical values of the parameters A and C based on elapsed time t and an earlier elapsed time $t_x$, say t-10 (i.e., a point ten seconds earlier than t). The difference between these two computed values is equivalent to the second prediction function for obtaining the temperature differential $\Delta U$. In the illustrated embodiment, we have:

$$\Delta U_1 = U_x - U = (-0.0025A - 0.0035)(t_x - t) + C\{(t_x + 1)^A - (T+1)^A\} \quad (6)$$

for $10 < t < 100$, the foregoing being the computation performed in step 125, and $$\Delta U_2 = U_x - U = (-0.0025A - 0.0035)(t_x - t) + C\{(t_x + 1)^A - (t+1)^A\} + +0.02(t_x - t)/(C+10) \quad (7)$$

for $t > 100$, this being the computation performed in step S126.

The decision steps S124, S131 are preformed by the main arithmetic unit 20 in accordance with the functions thereof described above. It is decided in step S129 whether to move to step S135 or S136 for computing the corrective temperature differential based upon Eq. (4) or (5), respectively. In order that the temperature increment computing means 21 may perform step S125, two values of the temperature differential U in terms of t and $t_x$ are delivered to the computing means 21 as signal 135 at intervals of, say, one second. The flow-chart of FIG. 6 illustrates an algorithm for the case where $\Delta U$ is computed by performing the operations of Eqs. (6) and (7). However, it is also possible to adopt a method wherein U is computed through a subroutine, and $\Delta U$ is then computed based on the results of the computations for each U, as illustrated in the block diagram of FIG. 5.

The temperature data output 102 of the measurement circuit 2 (FIG. 1) is constantly applied to the memory 7 through the data read-in unit 6. In accordance with a memory instruction signal (not shown) received from the control unit 5 e.g., every second, the memory 7 stores, say, 10 items of temperature data, in 10 seconds of time, in regular order from older data to newer data. As new data is sampled, the most recent data is stored in the memory 7 such that the oldest data is discarded. Assume that, e.g., the oldest and newest items of data are delivered from the memory 7 to the predicting arithmetic unit 9 as the signal 107. These data are treated as temperature $T_x$ ten seconds prior, and present temperature T, respectively. The former is applied as signal 136 to the adding means 22 for implementing the adding step S127 in order to calculate the real-time predicted temperature.

The adding means 22 implements step S127 for adding the output $\Delta U$ of the temperature increment computing means 21 and the temperature $T_x$, which prevailed ten seconds earlier, and supplies subtracting means 23 with the signal 138 indicative of the real-time predicted temperature T'. The subtracting means 23 subtracts the real-time predicted temperature T' from the present temperature T and sends the result as the output 139 to the evaluating means 24. The latter, which receives a signal 133 representing the evaluation function output (f) from the main arithmetic means 20, uses f to perform step S128, namely to evaluate the difference between the real-time temperature T and the results of predicting the present temperature from the data which prevailed ten seconds earlier. Note that f is a suitably selected evaluation function. Using the following function as f is particularly convenient:

$$f = (t_x + 1)^{-1.0} - (t+1)^{-1.0} \quad (8)$$

Figure 4:
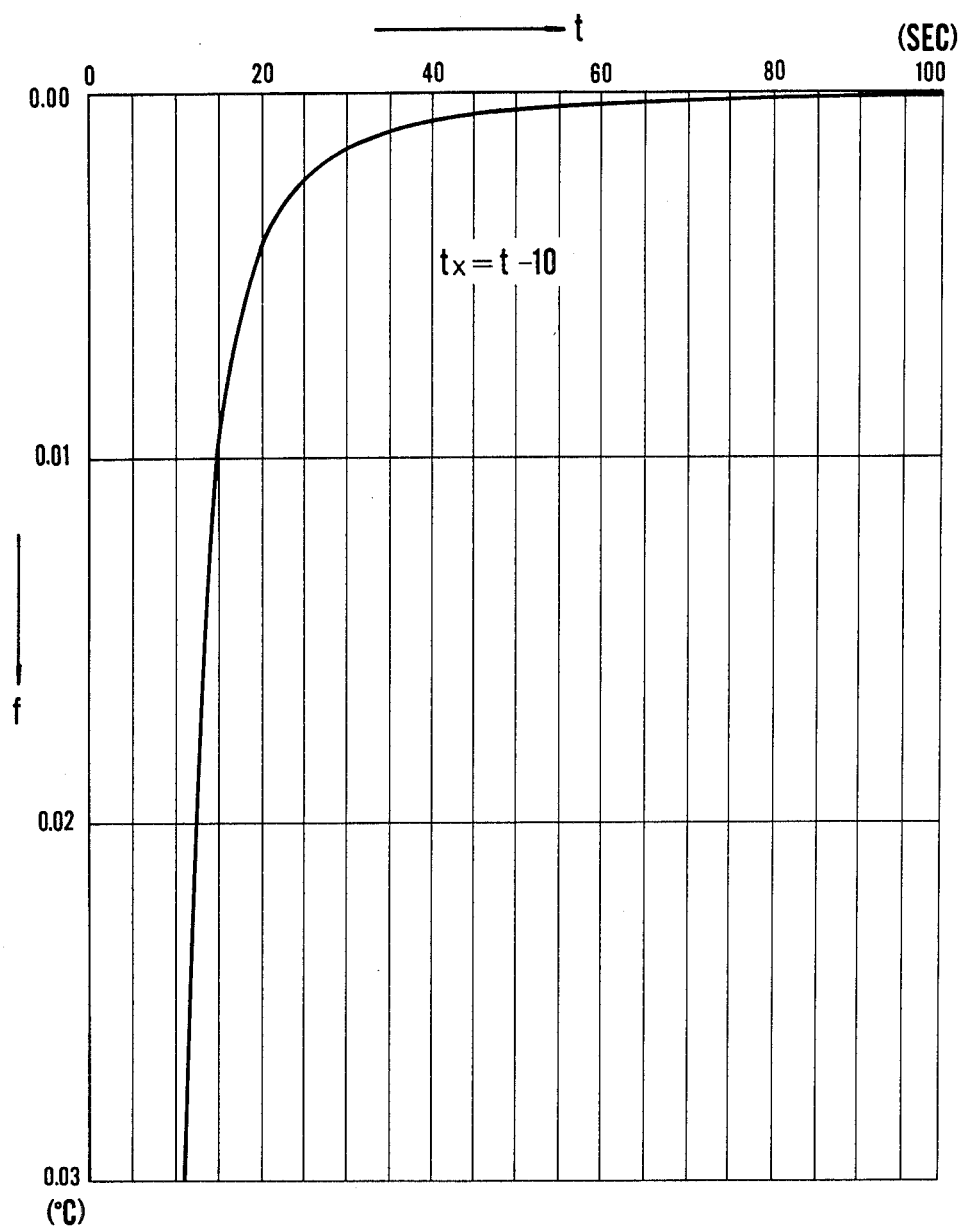
FIG. 4 is a graph indicating an evaluation function f for a case where an instant in time ten seconds prior to the present is used as a past time $t_x$.

This is for dealing with situations where a change in predicted value becomes large when the parameter is altered in a case where t is small, and where a change in predicted value becomes increasingly smaller as t grows larger. FIG. 4 shows the change in f for a case where $t_x$ is ten seconds prior to the present time t. In principle, Eq. (8) conforms to the following:

$$f = (U_{x,c=c+1} - U_{c=c+1}) - (U_{x,c=c} - U_{c=c}) \quad (9)$$

The evaluation function f is represented by the general expression of Eq. (9), but takes on the following forms for the conditions indicated:

$$f_1 = (t_x + 1)^A - (t+1)^A \quad (10)$$

when $10 < t < 100$ holds, and $$f_2 = (t_x + 1)^A - (t+1)^A + 0.02\{1/(C+11) - 1/(C+10)\}(t_x - t) \quad (11)$$

when $t > 100$ holds.

The results of evaluation may take one of three forms:
(i) $T - T' \geq f$, indicating a step for increasing the value of the parameter C;
(ii) $|T - T'| < f$, indicating execution of the next step, without altering the parameter;
(iii) $T - T' \leq -f$, indicating a step for decreasing the value of the parameter C.

The signal 140 produced by the evaluating means 24 decides which of the foregoing steps is executed.

In step S130 for increasing the value of the parameter C, the current value in the $C_A$ counter register 27 is incremented by one step. At the same time, in decision step S133, C is monitored to detect whether it exceeds the maximum value $C_{MAX}$, in accordance with TABLE I. When $C_{MAX}$ is exceeded, processing advances to step S137, which calls for the current value in the A counter register 28 to be increased by 0.1. In step S139, the value in the counter register 28 is reset in accordance with TABLE I.

Let us describe a specific example for a case in which an intial setting, performed in step S123, is updated. When the parameter C is found to exceed 11 in step S133, processing moves to step S137 in which 0.1 is added to the parameter A, making A equal to $-0.7$. In the following step S139, the parameter C is set to a new value 6 ($C_{NEXT}$) in accordance with TABLE I.

In decision step S141, the value of A is monitored and, when $A > -0.6$ holds, an error signal 114 is issued in a display step S144, in response to which the display unit 4 displays "ERROR" or the like, upon which the display holding unit 11 is rendered operational to freeze the display "ERROR" in the display freeze step S107

(FIG. 2). Another part of the error signal 114 causes step S108 to be executed, whereby operation of the processor 3 is terminated. When the decision is "NO" in step S133 or S141, the system exits from the measurement processing steps.

When the parameter C is found to be less than 9 in step S132, processing moves to step S134 where 0.1 is subtracted from the parameter A, making A equal to −0.9. Then, as described above, processing moves to step S138 where the parameter C is set to a new value of 18 ($C_{NEXT}$) in accordance with TABLE I. Next, step S140 calls for a decision as to whether the parameter A is equal to or greater than the lower limit value −1.0. If the decision is "NO", the system similarly exits from the measurement processing steps; if "YES", processing moves to step S143. In a case where the above step is executed, the predicted temperature data Tp to be displayed has not yet been computed, so that the temperature predicted to be reached at stabilization is not displayed even if the display step 105 (FIG. 2) is executed.

When processing enters the loop which does not call for the parameters to be altered, processing moves to step S135 or S136 for computing a corrective temperature differential. Since this loop is traversed when the parameters used in the foregoing computations are suited to the real-time temperature change, the prediction is appropriate. Processing therefore advances to adding step S142, which is executed by the adder 25 using the results of the corrective temperature differential computation. Specifically, the adder 25 receives the signal 141 indicative of the present temperature T, as well as the signal 134 indicative of the corrective temperature differential U, and computes the predicted final temperature Tp, which is to be attained upon stabilization. The adder 25 applies the signal 104 indicative of Tp to the display unit 4, which responds by actually displaying Tp in the display step 105.

When it is decided in the decision step S128 that processing is to move to the step for decreasing the value of the parameter C, steps S129, S132, S134, S138, S140 are executed in entirely the same way as the corresponding steps implemented when the value of the parameter C is increased. In this manner, the predicting arithmetic unit 9 of the present embodiment is oral detection of temperature, corresponding to A = −1.0, and armpit detection of temperature, corresponding to A = −0.6, are discriminated automatically, with body temperature being predicted in a manner suited to the particular detection method.

Figure 7:
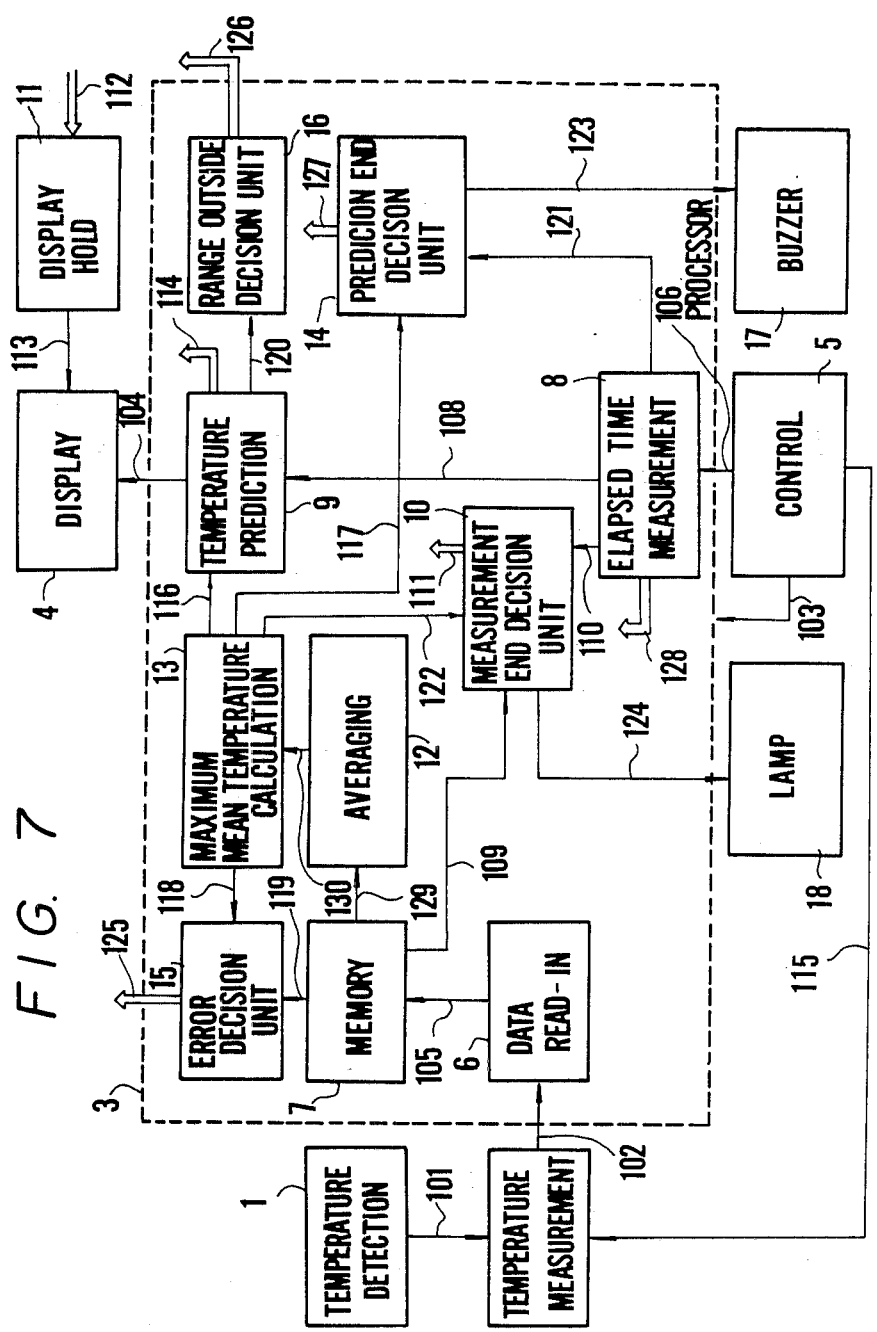
FIG. 7 is a block diagram illustrating another embodiment of an electronic clinical thermometer according to the present invention.
Figure 8:
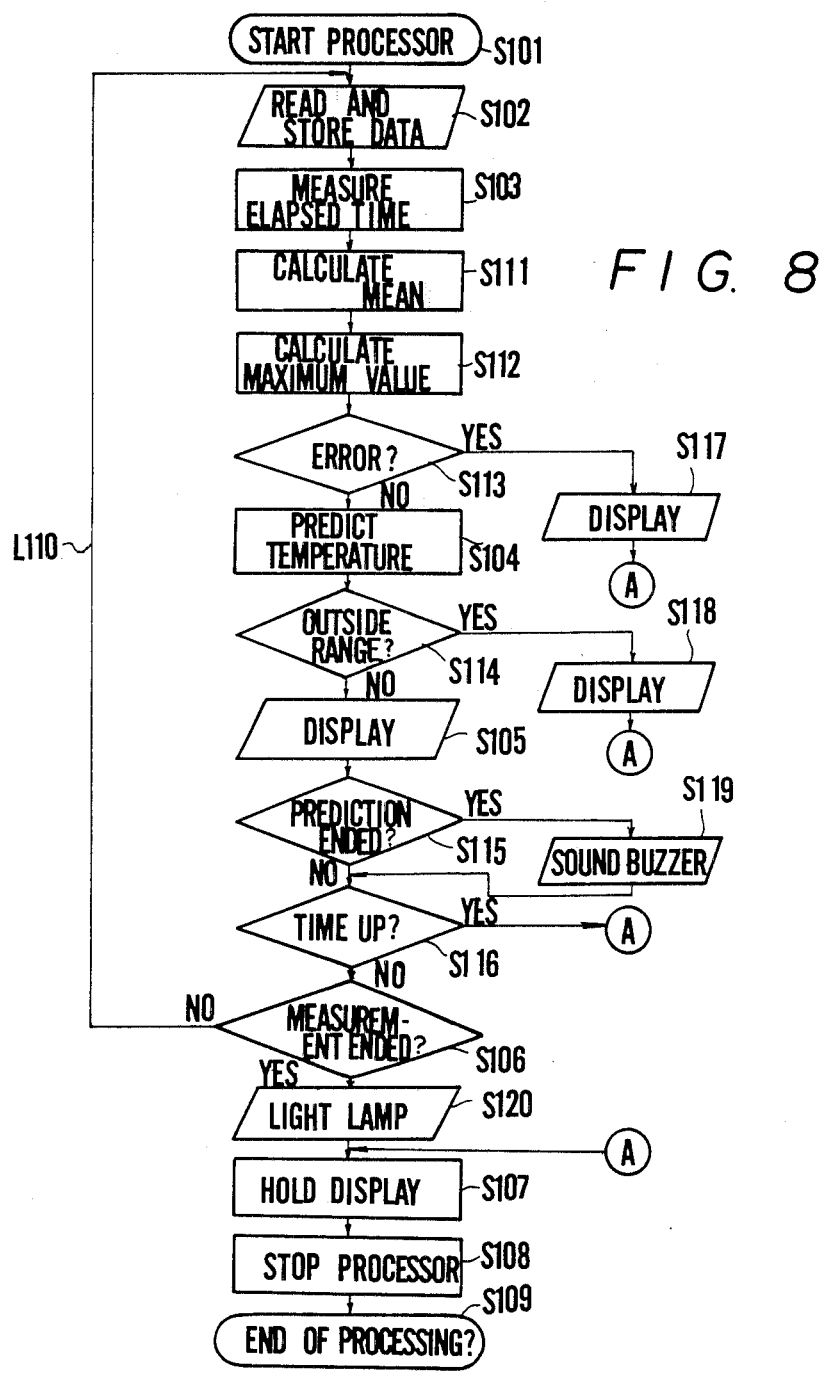
FIG. 8 is a flowchart indicating the operation of the electronic clinical thermometer shown in FIG. 7.

FIGS. 7 and 8 illustrate another embodiment of the present invention, which differs from the first embodiment in that the processor 3 is additionally provided with a mean temperature calculating and detecting unit 12, a maximum mean temperature calculating and detecting unit 13, an error decision unit 15, a prediction end decision unit 14 and a decision unit 16 which determines whether an input signal is outside a predetermined range (the unit 16 being referred to as a "range exceeded" decision unit hereinafter), and in that a buzzer 17 and lamp 18 are connected to the processor 3.

The mean temperature calculating and detecting unit 12 calculates the arithmetic mean of the most recent series of temperature data measured each measurement cycle. The arithmetic mean temperature which can be defined herein as moving average temperature is used to reduce the influence of a slight fluctuation in temperature data upon results in a latter processing stage, such as the prediction processing stage. For example, with temperature data that is acquired every second, use is made of the arithmetic mean of 5 to 15 items of present temperature data T and of temperature Tx which prevailed ten seconds prior. The maximum running mean temperature calculating unit 13 receives a running mean temperature signal 130, this signal being provided by the running mean temperature calculating unit 12 every cycle. If the signal 130 received is larger in magnitude than the immediately preceding signal 130, the calculating unit 13 keeps the signal and uses it (namely the maximum running mean temperature) in a subsequent processing step. If the signal 130 is smaller than that which immediately preceded it, the signal is discarded.

The prediction end decision unit 14, touched upon briefly hereinabove in connection with the first embodiment, determines when elapsed time has surpassed a certain, fixed value, and when a temperature change has fallen below a certain, fixed value. The error decision unit 15 compares a signal 119 from the memory 7, which signal is indicative of the most recent temperature data, with the maximum mean temperature detection signal 118 from the maximum mean temperature calculating and detecting unit 13. If the decision unit 15 finds that the most recent temperature is smaller than the maximum mean temperature by an amount in excess of a predetermined value, such as 0.1° C., prior to the abovementioned two conditions being satisfied, then the decision unit 15 decides that an error has occurred. The error indication signifies that measurement has been interrupted before it can be assured that the result of a prediction computation has sufficient accuracy, or that the thermometer has slipped out from the region of the body being measured. In cases such as these, temperature is not displayed on the display unit.

The range outside decision unit 16 monitors the results of the prediction computations performed by the predicting arithmetic unit 9, and determines whether the result of a computation, namely the predicted value, is outside a predetermined temperature range, i.e., less than 30° C. or more than 43° C. The lamp 18 is provided adjacent the display unit 4, which employs, e.g., a liquid crystal display element, for illuminating the element. The buzzer 17 is a device for generating an audible signal to inform the operator that a prediction has ended.

The apparatus embodied in FIG. 7 operates in a manner which will now be described with reference to the flowchart of FIG. 8. Temperature data from the memory 7 are received by the mean temperature calculating unit 12, where the mean value of a series of the most recent several items of temperature data measured every cycle is computed. This corresponds to a mean value calculating step S111. The maximum mean temperature calculating and detecting unit 13 receives the mean temperature detection signal 130 from the mean temperature calculating unit 12 every cycle, and executes a maximum value calculating step S112, in which the mean temperature is kept if it is larger than that which preceded it, and discarded if it is not. The prediction end decision unit 14 determines when elapsed time has surpassed a predetermined value, and when a temperature change has fallen below a predetermined value. The error decision unit 15 determines that an error has occurred when the most recent temperature data signal 119 is smaller than maximum mean temperature detection signal 118 by an amount in excess of a predetermined value, such as 0.1° C., before the abovementioned two conditions are satisfied. This corresponds to an error decision step S113.

When the decision unit 15 produces a signal 125 indicating that an error has occurred, a portion of the signal serves as the signal 112 applied to the display holding device 11, and as a signal for effecting the display "ERROR" or the like. Thus, in the display step S117, "ERROR" is displayed by the display unit 4. This is followed by actuating the display holding device 11, which executes step S107 to freeze the display "ERROR". The other portion of the signal 125 causes step S108 to be executed to halt operation of the processor 3. The error decision step S113 is executed every cycle until realization of the aforementioned conditions on the basis of which a prediction is deemed to have ended. When the conditions materialize, step S113 is skipped thereafter.

If "NO" is the decision rendered in step S113, then the predicting arithmetic unit 9 executes step S104 to execute prediction processing to predict what the stabilized temperature will be. In this embodiment, the processing is performed using the maximum mean temperature detection signal 116 and the elapsed time signal 108, the latter being produced by the elapsed time measuring unit 8. The result of the computation in step S104, which appears as the output 120 of the arithmetic unit 9, is monitored in the decision step S114 executed by the range outside decision unit 16. When the result is outside the predetermined temperature range, e.g., less than 30° C. or more than 43° C., a "YES" decision is rendered. At such time the decision unit 16 produces a range outside signal 126, a part of which causes the display unit 4 to display, e.g., "OUTSIDE" in step S118. Thereafter, the operation is similar to that performed by the error decision unit 15. When the range outside decision unit 16 renders a "NO" decision, the display unit 4 executes display step S105 in response to the display output signal 104 indicative of the predicted value from the predicting arithmetic unit 9.

In a prediction end decision step S115, the prediction end decision unit 14 monitors the elapsed time signal 121 and the maximum mean temperature detection signal 117. When signal 121 is indicative of a time longer than a predetermined time period (e.g., 30 sec) and signal 117 exhibits a predetermined change (e.g., a change within 0.2° C./sec), the decision unit 14 renders a "YES" decision and produces a signal 123 to sound the buzzer 17, thereby executing step S119. At this time the prediction end decision unit 14 produces the prediction end signal 127. Though the steps are not shown in the flowchart, it is possible to arrange for this signal to freeze the display and halt the processor 3, as in the case of the outputs from the error decision unit 15 and range outside decision unit 16.

Once a "YES" decision has been rendered with regard to the prediction end decision, subsequent prediction end decisions are skipped. Next, besides measuring elapsed time from the start of operation of the processor 3 in the elapsed time measurement step S103, the elapsed time measuring unit 8 executes step S116 to render a decision regarding an elapsed period of time, e.g., 15 min, which is long enough to assure that any ordinary measurement will come to a definite conclusion. If the decision is "YES" in step S116, the elapsed time measuring unit 8 automatically produces a time-up signal 128 to freeze the display and halt the operation of the processor 3. The function of the measurement end decision unit 10 is to monitor the maximum mean temperature detection signal 122 and the most recent temperature data signal 109 in the measurement end decision step S106. Once a prediction is judged to have ended in the prediction end decision step S115, the measurement end decision unit 10, in step S106, determines whether the most recent temperature is lower than the detected maximum mean temperature by an amount in excess of a prescribed value, e.g., 0.1° C. If it is, the decision unit 10 produces an output signal 124 immediately or after a prescribed period of time, e.g., five or six seconds, to light the lamp 18 for a prescribed period of time, e.g., two to four seconds. This is step S120. The decision unit 10 also produces a measurement end signal 111 to freeze the display and halt the processor 3 (step 107). The reason for lighting the lamp 18 is to allow the display to be read even in the dark. Processing continuously traverses the loop L110 to continue the measurement until a "YES", i.e., end of measurement, decision is rendered in step S106.

Thus, in the electronic clinical thermometer embodied in FIG. 7, the mean temperature calculating and detecting unit 12 is additionally provided to solve the problem of fluctuation which may develop in the results of the prediction computations, and the maximum mean temperature calculating and detecting unit 13 is used to more effectively perform the error decision, measurement end decision and prediction end decision operations. Also provided is the range outside decision function. Thus, according to the embodiment of FIG. 7, whenever a "YES" decision is rendered in the error decision step, range outside decision step, measurement end decision step or time-up decision step (or in the prediction end decision step if so desired), the processor 3 is halted while the display is caused to remain frozen on the display unit 4 by the display holding device 11. All of these displayed results are of importance to the operator and should be frozen long enough to at least be read by the operator. In an ordinary glass thermometer, the result of measurement is preserved as long as the mercury is not shaken down. In an electronic clinical thermometer, it is advantageous to freeze the display until the beginning of the next measurement, as in the present embodiment. Further, halting the operation of the processor 3 at the end of each "YES" decision is important in terms of reducing excess power consumption. If the processor 3 is of CMOS construction, for example, power saved by halting processor operation is quite significant.

In the discussion of the embodiment of the present invention, the detected maximum mean temperature alone or together with the detected temperature is employed in steps of predicting computations, error decisions, decisions for predicting computations, and the decisions for measurement. However, it is possible to employ the detected mean temperature alone or together with the maximum mean temperature in all or any one of the abovementioned steps.

Reference will now be had to FIGS. 9 through 12 for a detailed description of the hardware constituting those portions that are not implemented by the microcomputer. As for the correspondence between the components of FIG. 1 and those of FIG. 9, the temperature detecting unit 1 in FIG. 1 corresponds to a thermistor 201 in FIG. 9, the measurement circuit 2 is equivalent to block 2 defined by the broken line, and the control unit 5 corresponds to block 5 defined by the broken line. The processor 3 is realized by a microcomputer 231.

Figure 11:
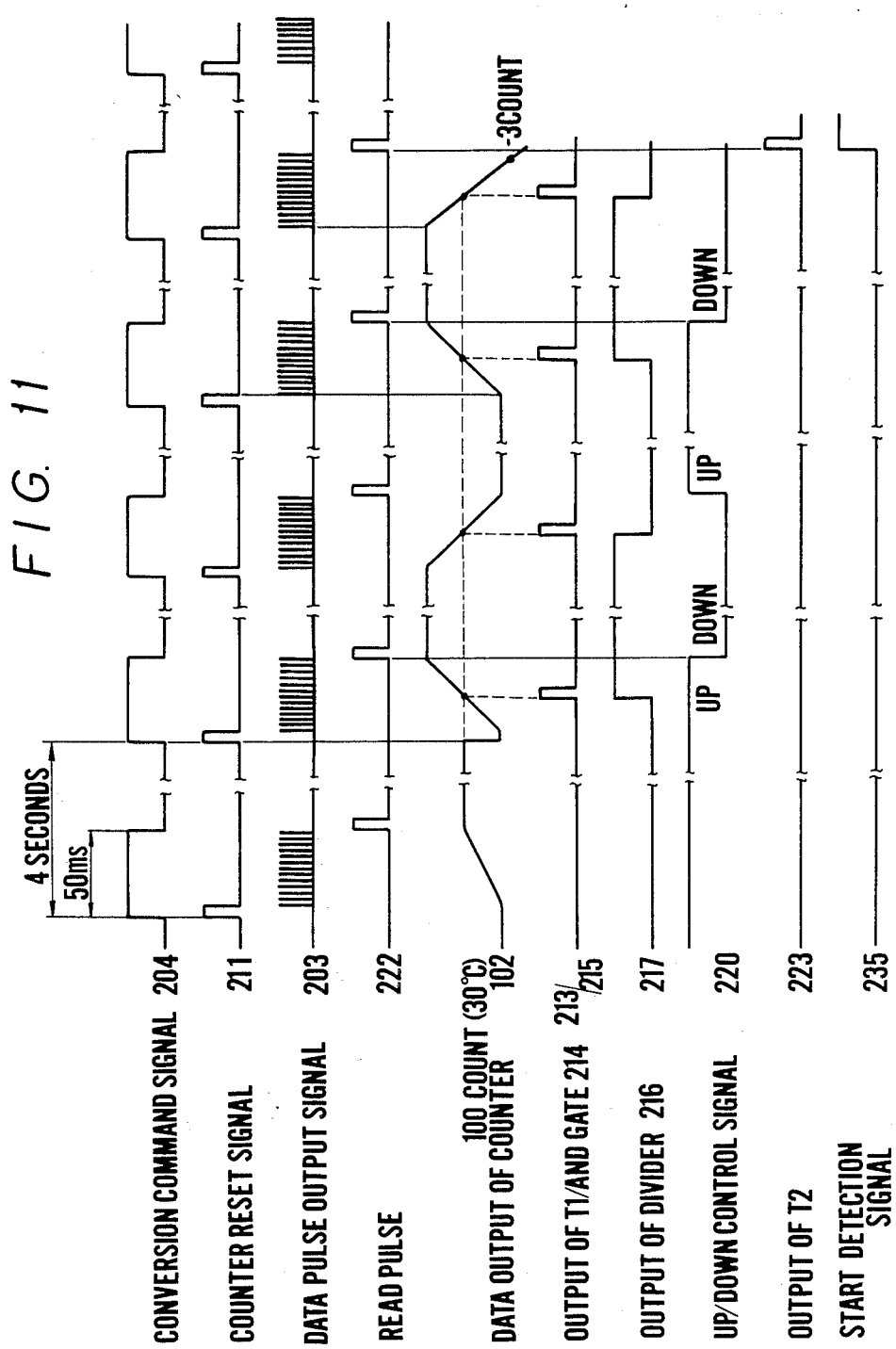
FIG. 11 is a timing chart useful in describing the operation of the arrangement shown in FIG. 9.

The construction of the arrangement shown in FIG. 9 will be described in further detail with reference to the timing chart of FIG. 11.

The thermistor 201 for measuring body temperature is connected to the converting circuit 202 for converting resistance into a pulse frequency. The converting circuit 202 receives a reference clock signal 206 and a conversion command signal 204 from a control unit 227. When the command signal 204 from the control unit 227 goes to logical "1", thereby constituting a start signal, the converting circuit 202 begins the conversion operation. Signal 204 is sent to logical "0" by a onversion end signal 205 which the converting circuit 202 delivers to the control unit 227, ending the conversion operation.

Figure 10:
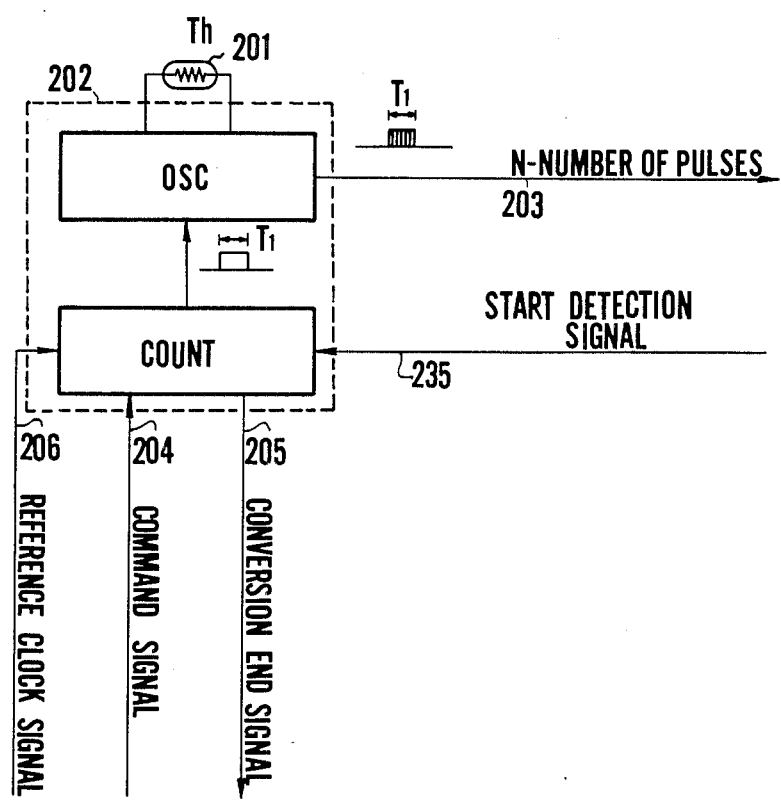
FIG. 10 is a circuit diagram illustrating the construction of a converter, included in the arrangement of FIG. 9, for converting resistance into a number of pulses.

As shown in FIG. 10, the converting circuit 202 includes an oscillator OSC the oscillation frequency whereof varies with the resistance of the thermister 201, and a counter COUNT for controlling oscillation, and is adapted to deliver pulses 203 which the oscillator produces during a fixed time interval (namely the conversion time of the converting circuit). These pulses constitute the output of the converting circuit 202. The higher the temperature, the higher the frequency of the pulses. The counter COUNT, which controls the time for carrying out the conversion, responds to the conversion command signal 204 by supplying the oscillator OSC with a conversion command of a predetermined duration T1. Upon receiving the signal, the oscillator OSC produces a number of pulses corresponding to the length of time T1. The counter produces the conversion end signal 205 when the conversion time T1 expires. It should be noted that when the counter COUNT receives a measurement start detection signal 235, to be described below, the counter COUNT is set to produce a conversion time longer than T1. This lengthens the conversion time to raise the conversion precision. These measures of time are produced on the basis of the reference clock signal 206.

Returning to FIG. 9, the abovementioned pulses produced by the converting circuit 202 exit as a data pulse output signal 203. These pulses constitute the clock (CLK) input to a counter 207. The counter 207 is of the reversible counting-type and has an up/down (U/D) terminal for deciding the counting direction. When logical "1" appears at terminal U/D, the counter 207 counts up its clock input. Logical "0" at terminal U/D causes the clock input to be counted down. R denotes the reset terminal of counter 207. The data output 102 (corresponding to 102 in FIG. 1) of counter 207 corresponds to temperature data and is applied to a decoder 212 as a data input. The decoder 212 is adapted to produce a logical "1" output on its output terminal T1 upon receiving from counter 207 a data input equivalent to 100 pulses, this occurring when the thermister 201 senses a temperature of 30° C. Thus, the block 31 defined by the broken line constitutes a temperature threshold detecting circuit. Numeral 214 denotes an AND gate whose two inputs are the output from the terminal T1 of the decoder 212, and a decode control signal 229 from a control unit 227. When the thermistor 201 senses a temperature of 30° C. or more in a preliminary measurement, causing logical "1" to appear on terminal T1 of the decoder 212, and when the decode control signal 229 is logical "1", the output signal 217 of the divide-by-2 frequency divider 216 goes to logical "1". This signal is applied to the data input of a data-type flip-flop 218. The clock input to the flip-flop 218 is a read pulse 222 produced by the control unit 227 in sync with the trailing edge of the conversion command signal 204 in order that the data input may be stored in the flip-flop 218. With the data input to the data-type flip-flop 218 being logical "1", the Q output of the flip-flop 18, namely an up/down control signal 220, goes to logical "0". The counter 207, which receives the Q output at its U/D terminal, is switched over from the up-count to the down-count mode and begins counting down the pulses 203. In addition, a counter reset signal 211 is gated by an AND gate 219 and not allowed to pass. Accordingly, the data pulse input 203 to the counter 207 resulting from the next conversion command signal 204 will count down the counter from the value of the previous up-count operation.

The final value resulting from the down-count operation will be zero when the previously measured temperature and the temperature just measured are the same. When the latter is higher, however, counter 207 is counted down beyond zero to a negative value. When this value reaches a count of, say, −3 (corresponding to a temperature of +0.3° C.) or a more negative value, an output pulse 223 emerges from terminal T2 of decoder 212 and enters a flip-flop 224 at the clock terminal CLK thereof, the flip-flop 224 responding by producing the measurement start detection signal 235. The block 32 defined by the broken line constitutes temperature change detection circuit. This signal 235 is fed back to the converting circuit 202, placing it in a body temperature measurement mode, and elevating its precision, from this point onward. The signal 235 is also applied to one input terminal of an AND gate 233 in the control unit 5. The AND gate 233 takes the AND between this signal and a time interrupt signal 234 generated by the microcomputer 231 every second, whereby the microcomputer 231 is interrupted. In response to the initial interrupt, the processor start step S101 in FIG. 2 is executed, followed by execution of the steps from the data read-in and store step S102 onward. Whenever the interrupt is applied, i.e., every second, each of the steps in the loop 110 is executed and elapsed time is measured.

A measurement start signal 230 produced as an output by the microcomputer 231 every second from this time onward functions as a sampling command. When the signal enters the control unit 227, the latter produces the conversion command signal 204 whereby the value corresponding to the temperature measured by the thermistor 201 appears as the output data 102 from counter 207. This value is then read in, operated upon, processed and displayed by the microcomputer 231. At the end of the body temperature measurement, the microcomputer 231 sends a measurement end signal 228 to the control unit 227 to again establish a pre-measurement mode for sensing the start of a measurement. The microcomputer 231 again enters a stand-by state at this time to reduce power consumption. It should be noted that the display unit 4, such as a well-known liquid crystal display device, the buzzer 17 and lamp 18 are connected to the microcomputer 231 as output means, as illustrated in FIG. 7. Further, the display holding device 11 includes a latch circuit (not shown) holding error codes and the like, and the arrangement is such that whatever is set in the latch circuit is displayed compulsorily on the display unit 4.

Returning to the state of counter 207, a count of less than −3 (i.e., −2, −1, 0, +1 . . . ) will not cause logical "1" to appear at the output 223 of the decoder 212. Flip-flop 224 therefore will not be set, and the measurement start detection signal 235 will not appear. At this time, when a count of 100 is passed in the reverse direction near the start of the down-count operation, the output of the divide-by-two frequency divider 216 again changes state because it is receiving the "1" logic of the decoded output 215 at the start of the down-count operation. In consequence, flip-flop 218 changes state again. The resulting high level of signal 220 places the counter 207 in the up-count mode and, with the arrival of signal 211, in the reset state. This re-establishes the conditions for detection of a temperature of 30° C. or more.

Figure 12:
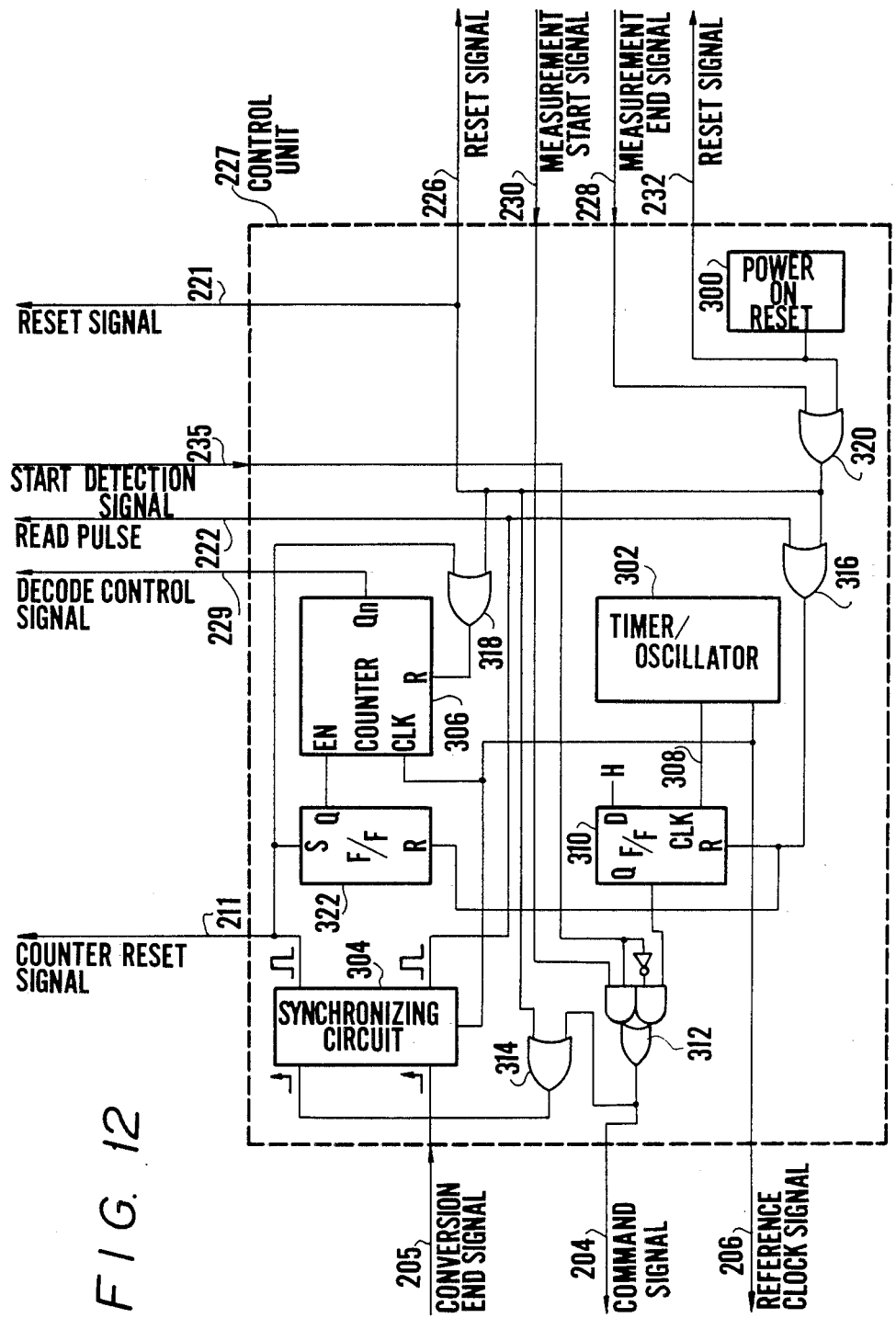
FIG. 12 is a block diagram illustrating the detailed construction of a control unit shown in FIG. 9.

The construction of the control unit 227 is shown in FIG. 12. Numeral 300 denotes a power-on reset circuit for producing the reset signal 232 when power is introduced to the electronic clinical thermometer of this embodiment from a power supply. Signal 232, as well as being sent to the microcomputer, functions to reset the logic within the control unit 227. A timer/oscillator circuit 302 delivers the reference clock 206 to the converting circuit 202, the clock 206 also being used as a control clock for the logic within the control unit 227. By way of example, the clock 206 is used by a synchronizing circuit 304, comprising a plurality of flip-flops, to produce the pulses 211 synchronized to the clock 206 at the leading edge of its input signal, and is used as a timer counting clock by a counter circuit 306 for producing the decoder control signal 229. The oscillator circuit 302 also produces a clock 308. This serves as a pre-measurement timing clock, set to a period of four seconds, for use in the abovementioned preliminary measurement operation of low accuracy. A preliminary measurement flip-flop 310 is triggered by the leading edge of the clock 308 and produces a measurement start signal (command signal) 204 of its own via an OR gate 312 while the measurement start signal 235 is at logical "1". The other input to OR gate 312 is the measurement start detection signal 230, in response to which the measurement start signal 204 is produced, this signal appearing after the measurement start detection signal 235 goes to logical "1". An OR gate 314 is provided in order that the reset signal 211 for the counters 207, 306 may be formed in sync with the command signal 204 or reset signal 226. The conversion end signal 205 activates the synchronizing circuit 304 which responds by producing the read pulse 222 and, through an OR gate 316, by resetting corresponding flip-flops 310, 322. Reset signals 221 and 226 are produced by an OR gate 320 in response to the power-on reset signal 232 or the measurement end signal 228 from the microcomputer 231.

Figure 9:
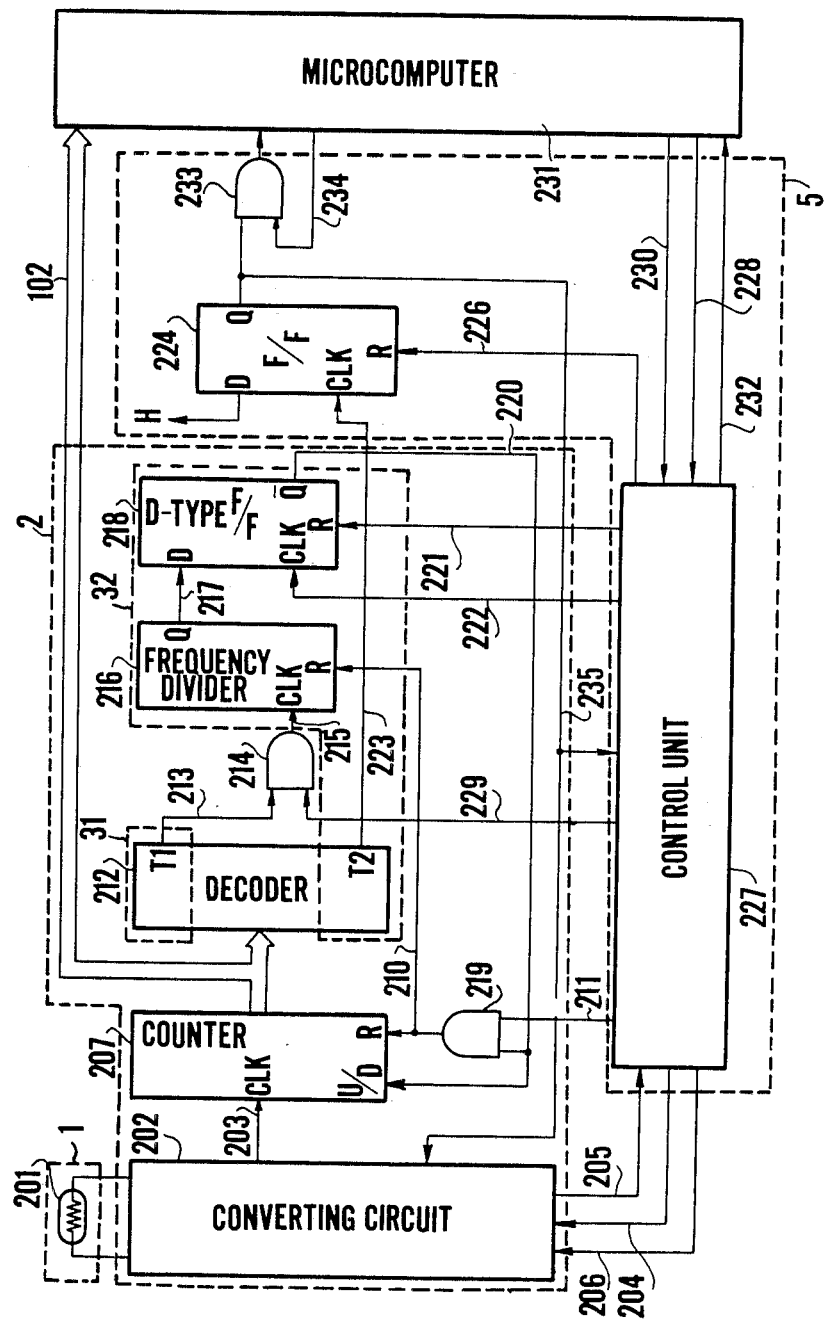
FIG. 9 is block diagram illustrating the details of the embodiment shown in FIG. 1.

The circuit shown in FIG. 9 is constructed using C-MOS technology. At the instant power is introduced to the circuitry, the counter-set signal 211 and flip-flop-set signals 221, 226 are produced to reset the counter and flip-flops. The microcomputer 231, on the other hand, receives a reset signal 232 for initialization, upon which the microcomputer is placed in the stand-by state to suppress power consumption.

Reference will now be had to FIGS. 13A and 13B to describe processing executed by the microcomputer 231 when power is introduced.

Referring first to FIG. 13A, the measurement start signal 230 is set to a low level when power is introduced. Next, the measurement end signal 228 is set to the low level and internal registers are cleared, establishing a waiting state.

In FIG. 13B, the microcomputer 231 has been started by the interrupt start signal 234 generated every second and produces the measurement start signal 230. Thereafter the timer is set and the microcomputer awaits for the end of an A/D conversion, i.e, for the conversion of temperature information into digital data. When the time kept by the timer expires, the data output 102 on the data bus is read in, computations and processing are executed on the basis of the data, the predicted temperature is displayed, and so forth. When the body temperature measurement ends, the measurement end signal 228 goes to logical "1" and the CPU is placed in a waiting state. The CPU enters the suspended state both after the execution of prescribed computations and in cases where the temperature measurement has not ended. This has already been described hereinabove.

Further, an arrangement is possible wherein the functions of the temperature threshold value detecting circuit 31, temperature change detecting circuit 32 and control unit 5 may be implemented by microcomputer software having a timer interrupt function.

Based on the construction and operation of the present invention as described in detail hereinabove, those skilled in the art will have no difficulty in realizing the invention through software by devising a program capable of implementing functions equivalent to those of the invention as described.

With the electronic clinical thermometer and measurement method of the present invention as described hereinabove, a predicted value of a final, stabilized temperature can be displayed at an accuracy commensurate with the volition of the user. Specifically, the longer the duration of a measurement, the more the accuracy of the prediction can be raised over that ordinarily obtained. When inspecting the thermometer, calibration and verification of the temperature display can be performed without the application of special conditions and without switching to another mode. Furthermore, since the user is not compelled to rely upon a particular detection method peculiar to the thermometer, temperature can be measured correctly by various detection methods merely by lengthening the duration of the measurement. In addition, it is possible to end a measurement at any desired point in time, and the result of a measurement can be preserved on the display until, for example, the next measurement is performed, with minimum consumption of power. This makes it possible to reduce the overall power consumed by the thermometer.

As many apparently widely different embodiments of the present invention can be made without departing from the spirit and scope thereof, it is to be understood that the invention is not limited to the specific embodiments thereof except as defined in the appended claims.

What we claim is:

1. An electronic clinical thermometer, comprising:
temperature detecting means for detecting temperature at a part of a body and for generating a temperature signal indicative of the detected temperature;
storage means for sequentially storing the temperature signal serially in time;
elapsed time measuring means for measuring time which has elapsed since start of measurement and for generating an elapsed time signal indicative of the measured elapsed time;
prediction means for obtaining a predicted value of a stable temperature from the temperature and the elapsed time signals on the basis of a stable temperature prediction function in which measurement time is a variable, the function defining a temperature change up to a final, stable temperature;

control means coupled to said time measuring means and said prediction means, wherein a computation for predicting a stable temperature is preformed by said prediction means periodically in response to said control means;

display means for displaying a predicted value of stable temperature; and measurement end decision means responsive to said elapsed time measuring means for reading the temperature signal, corresponding to two successive points in time, out of said storage means and for comparing the two signals;

wherein after said measurement end decision means determines that the elapsed time signal has exceeded a first prescribed elapsed time and that a difference exhibited by the temperature signal corresponding to two successive points in time no longer shows an increase outside a first prescribed range, the temperature signal corresponding to a present point in time is compared by said measurement end decision means with the temperature signal at the preceding point in time and, when the first-mentioned temperature signal exhibits a decrease outside a second prescribed range, said measurement end decision means halts the operation of said prediction means.

2. The electronic clinical thermometer according to claim 1, wherein when said measurement end decision means compares the temperature signal corresponding to a present point in time with the temperature signal at the Preceding point in time and determines that the first-mentioned temperature signal exhibits a decrease outside the second prescribed range before the difference exhibited by the temperature signal corresponding to two successive points in time ceases to show an increase outside the first prescribed range, said measurement end decision means causes said display means to present a first display indicative of this state.

3. The electronic clinical thermometer according to claim 1, wherein said display means includes an audible signal generator, and when said measurement end decision means determines that the elapsed time signal has exceeded a prescribed elapsed time and that the difference exhibited by the temperature signal corresponding to two successive points in time no longer shows an increase outside the first prescribed range, said measurement end decision means actuates said audible signal generator.

4. The electronic clinical thermometer according to claim 1, wherein when a predicted value produced as an output by said prediction means is outside a third prescribed range, said measurement end decision said display means to present a second display indicative of this state.

5. The electronic clinical thermometer according to claim 2, wherein said measurement end decision means causes said display means to present the first display and halts the operation of said prediction means.

6. The electronic clinical thermometer according to claim 4, wherein said measurement end decision means causes said display means to present the second display and halts the operation of said prediction means.

7. The electronic clinical thermometer according to claim 1, wherein said display means includes a liquid crystal display element for presenting a visual display of the predicted value, and illuminating means for illuminating said liquid crystal display element, and said measurement end decision means actuates said illuminating means for a predetermined period of time before halting operation of said prediction means.

8. The electronic clinical thermometer according to claim 1, wherein when the elapsed time signal exceeds a second prescribed elapsed time greater than the prescribed length and greater than the first prescribed elapsed time, said measurement end decision halts operation of said prediction means.

9. An electronic clinical thermometer, comprising:

temperature detecting means for detecting temperature at a part of a body and for generating a temperature signal indicative of the detected temperature;

storage means for sequentially storing the temperature signal serially in time;

elapsed time measuring means for measuring time which has elapsed since start of measurement and for generating an elapsed time signal indicative of the measured elapsed time;

prediction means for obtaining a predicted value of a stable temperature from the temperature and the elapsed time signals on the basis of a stable temperature prediction function in which measurement time is a variable, the function defining a temperature change up to a final, stable temperature;

control means coupled to said time measuring means and said prediction means, wherein a computation for predicting a stable temperature is performed by said prediction means periodically in response to said control means;

display means for displaying a predicted value of stable temperature; and measurement end decision means responsive to said elapsed time measuring means for reading the temperature signal, corresponding to two successive points in time, out of said storage means and for comparing the two signals, wherein after said measurement end decision means determines that the elapsed time signal has exceeded a first prescribed elapsed time and that a difference exhibited by the temperature signal corresponding to two successive points in time no longer shows an increase outside a first prescribed range, the temperature signal corresponding to a present point in time is compared by said measurement end decision means with the temperature signal at the preceding point in time and, when the first-mentioned temperature signal exhibits a decrease outside a second prescribed range, said measurement end decision means halts the operation of said prediction means; and holding means for holding the predicted value of stable temperature prevailing when operation of said prediction means is halted.

10. The electronic clinical thermometer according to claim 9, wherein said display holding means causes said display means to display the predicted value of stable temperature prevailing when operation of said prediction means is halted.

11. The electronic clinical thermometer according to claim 10, wherein said measurement end decision means compares the temperature signal corresponding to a present point in time with the temperature signal at the preceding point in time and determines that the first-mentioned temperature signal exhibits a decrease outside the second prescribed range before the difference exhibited by the temperature signal corresponding to two successive points in time ceases to show an increase outside the first prescribed range, said measurement end decision means causes said display means to present a first display indicative of this state.

12. The electronic clinical thermometer according to claim 10, wherein when a predicted value produced as an output by said prediction means is outside a third prescribed range, said measurement end decision means causes said display means to present a second display indicative of this state.

13. The electronic clinical thermometer according to claim 11, wherein said measurement end decision means causes said display means to present the first display and halts the operation of said prediction means.

14. The electronic clinical thermometer according to claim 12, wherein said measurement end decision means causes said display means to present the second display and halts the operation of said prediction means.

15. The electronic clinical thermometer according to claim 9, wherein said display means includes a liquid crystal display element for presenting a visual display of the predicted value, and illuminating means for illuminating said liquid crystal display element, and said measurement end decision means actuates said illuminating means a predetermined period of time before halting operation of said prediction means.

16. The electronic clinical thermometer according to claim 9, wherein when the elapsed time signal exceeds a second prescribed elapsed time greater than the prescribed length and greater than the first prescribed elapsed time, said measurement end decision means halts operation of said prediction means.

17. The electronic clinical thermometer according to claim 9, wherein said holding means holds the predicted value of thermal temperature until a measurement is started again.

18. A method of measuring body temperature, comprising the steps of:
   detecting temperature at a part of a body and generating a detected temperature signal indicative of said temperature over a period of time;
   storing data corresponding to the detected temperature signal;
   measuring time which has elapsed since start of measurement and generating an elapsed measurement time indicative of said elapsed time;
   obtaining a predicted value of a stable temperature from the detected temperature data and elapsed measurement time on the basis of a stable temperature prediction function in which measurement time is a variable, the function defining a temperature change up to a final, stable temperature;
   performing a stable temperature prediction computation periodically and displaying the predicted value of stable temperature obtained;
   determining (a) when the elapsed measurement time exceeds a prescribed magnitude, and (b) a difference between detected temperature data obtained at two successive points in time no longer shows an increase outside a prescribed range; and
   halting the prediction computation after conditions (a) and (b) in said determining step are established and when the detected temperature data corresponding to a present point in time exhibits a decrease outside a prescribed range when compared with the detected temperature data at the preceding point in time.

* * * * *

UNITED STATES PATENT AND TRADEMARK OFFICE
CERTIFICATE OF CORRECTION

PATENT NO.  : 4,648,055
DATED       : March 3, 1987
INVENTOR(S) : ISHIZAKA et al It is certified that error appears in the above-identified patent and that said Letters Patent is hereby corrected as shown below:

Column 1, line 34, "June 24, 1983" should be -- June 24, 1982 --
          line 37, "3390 3390" should be -- 3390 --
Column 14, line 24, "conputing" should be -- computing --
Column 25, line 52 (claim 4), after "decision" insert -- means causes --
Column 26, line 7 (claim 8), after "decision" insert -- means --

Signed and Sealed this

Thirty-first Day of January, 1989

Attest:

DONALD J. QUIGG

*Attesting Officer*      *Commissioner of Patents and Trademarks*